United States Patent
Stein et al.

(10) Patent No.: US 12,235,251 B2
(45) Date of Patent: Feb. 25, 2025

(54) CHROMATOGRAPHY METHOD, METHOD OF DETERMINING THE CONCENTRATION OF AT LEAST ONE COMPOUND IN A CHROMATOGRAPHY METHOD, METHOD OF OBTAINING AN ADSORPTION ISOTHERM, METHOD OF OBTAINING AT LEAST ONE STATIONARY PHASE AND METHOD OF EVALUATING THE ACCURACY OF A PREDETERMINED ADSORPTION ISOTHERM

(71) Applicant: Sartorius Stedim Biotech GmbH, Göttingen (DE)

(72) Inventors: Dominik Stein, Göttingen (DE); Jan Schwellenbach, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 423 days.

(21) Appl. No.: 17/613,701

(22) PCT Filed: May 8, 2020

(86) PCT No.: PCT/EP2020/062856
§ 371 (c)(1),
(2) Date: Nov. 23, 2021

(87) PCT Pub. No.: WO2020/239393
PCT Pub. Date: Dec. 3, 2020

(65) Prior Publication Data
US 2022/0229029 A1     Jul. 21, 2022

(30) Foreign Application Priority Data

May 24, 2019   (EP) .................................. 19176446
May 24, 2019   (EP) .................................. 19176462
May 24, 2019   (EP) .................................. 19176467

(51) Int. Cl.
*G01N 30/86*   (2006.01)
*G01N 30/89*   (2006.01)

(52) U.S. Cl.
CPC ......... *G01N 30/89* (2013.01); *G01N 30/8658* (2013.01); *G01N 30/8675* (2013.01); *G01N 30/8696* (2013.01)

(58) Field of Classification Search
CPC ............... G01N 30/89; G01N 30/8658; G01N 30/8675; G01N 30/8696; G01N 30/88
See application file for complete search history.

(56) References Cited

U.S. PATENT DOCUMENTS 4,762,617 A  *  8/1988  Stevens .................. G01N 30/38
                                                    210/198.2
4,869,093 A  *  9/1989  Gilbert .................... G01N 30/88
                                                    422/89

(Continued)

FOREIGN PATENT DOCUMENTS

EP          0359320       9/1990
WO      WO2008/028974     3/2008

OTHER PUBLICATIONS

Baumann, P. et al., "Deconvolution of high-throughput multicomponent isotherms using multivariate data analysis of protein spectra," *Engineering in Life Sciences*, 16(2):194-201 (Mar. 2016).

(Continued)

*Primary Examiner* — David J Bolduc
(74) *Attorney, Agent, or Firm* — Klarquist Sparkman, LLP

(57) ABSTRACT

The present invention relates to a chromatography method, a method of determining the concentration of at least one compound in a chromatography method, a method of obtaining an adsorption isotherm, a method of obtaining at least (Continued)

one stationary phase and a method of evaluating the accuracy of a predetermined adsorption isotherm.

15 Claims, 11 Drawing Sheets

(56) References Cited

U.S. PATENT DOCUMENTS

| | | | | |
|---|---|---|---|---|
| 6,406,632 | B1* | 6/2002 | Safir | G01N 15/0205 |
| | | | | 210/198.2 |
| 6,416,663 | B1* | 7/2002 | Miroslav | G01N 35/1097 |
| | | | | 210/198.2 |
| 2002/0115566 | A1* | 8/2002 | Sessler | B01J 20/286 |
| | | | | 540/472 |
| 2003/0068828 | A1* | 4/2003 | Dadala | G01N 30/02 |
| | | | | 702/27 |
| 2006/0025932 | A1* | 2/2006 | Dadala | G01N 30/8675 |
| | | | | 702/19 |
| 2010/0252502 | A1* | 10/2010 | Witt | F04B 11/0075 |
| | | | | 210/656 |
| 2011/0195517 | A1* | 8/2011 | Lacki | B01L 3/5085 |
| | | | | 422/527 |
| 2013/0206653 | A1* | 8/2013 | Brann | B01L 3/545 |
| | | | | 210/198.2 |
| 2015/0087073 | A1* | 3/2015 | Chambers | G01N 30/88 |
| | | | | 436/86 |
| 2015/0198573 | A1* | 7/2015 | Habel | G01N 30/86 |
| | | | | 702/50 |
| 2019/0083951 | A1* | 3/2019 | Buchner, Sr. | B01J 19/0033 |
| 2019/0170705 | A1* | 6/2019 | Wyndham | G01N 30/72 |
| 2019/0317060 | A1* | 10/2019 | Condron | G01N 30/16 |
| 2020/0348274 | A1* | 11/2020 | Wang | B01J 15/422 |
| 2021/0300965 | A1* | 9/2021 | Nguyen | C07K 1/18 |
| 2022/0099638 | A1* | 3/2022 | Schwan | G01N 30/86 |
| 2022/0146416 | A1* | 5/2022 | Rathore | B01D 15/1864 |

OTHER PUBLICATIONS

Ahmad, T. et al., "Numerical determination of the adsorption isotherms of tryptophan at different temperatures and mobile phase compositions," *Journal of Chromatography A*, 1142(2):148-163 (Feb. 2007).

Berridge J., "Chemometrics and Method Development in High-performance Liquid Chromatography Part 1: Introduction," *Chemometrics and Intelligent Laboratory Systems*, 3(3):175-188 (Mar. 1988).

Extended Search Report for European Application No. 19174637.1, mailed Feb. 9, 2019.

Extended Search Report for European Application No. 19176446.3. mailed Dec. 2, 2019.

Extended Search Report for European Application No. 19176462.0, mailed Dec. 5, 2019.

Field, N. et al., "High-throughput investigation of single and binary protein adsorption isotherms in anion exchange chromatography employing multivariate analysis," *Journal of Chromatography A*, 1510:13-24 (Jun. 2017).

Gritti, F. et al., "Effect of the mobile phase composition on the isotherm parameters and the high concentration band profiles in reversed-phase liquid chromatography," *Journal of Chromatography A*, 995(1-2):37-54 (May 2003).

Grom, M. et al., "Protein A affinity chromatography of Chinese hamster ovary (CHO) cell culture broths containing biopharmaceutical monoclonal antibody (mAb): Experiments and mechanistic transport, binding and equilibrium modeling," *Journal of Chromatography B: Biomedical Sciences& Applications*, 1083:44-56 (Mar. 2018).

Hupe, K. P. et al., "Selection of Optimal Conditions in Preparative Liquid Chromatography," *Journal of Chromatography A*, 203:41-52 (Jan. 1981).

International Search Report and Written Opinion for PCT/EP2020/062856, mailed Jul. 31, 2020.

Khazraei Vizhemehr, A. et al., "Modeling of gas-phase filter model for high-and low-challenge gass concentrations," *Building and Environment*, 80:192-203 (Jun. 2014).

Mao, Q. M. et al., "Optimization of Affinity and Ion-Exchange Chromatographic Processes for the Purification of Proteins," *Biotechnology and Bioengineering*, 52(2):204-222 (Oct. 1996).

Piatkowski, W. et al., "Adsorbed solution model for prediction of normal-phase chromatography process with varying composition of mobile phase," *Journal of Chromatography A.*, 1092(1):65-75 (Oct. 2005).

Schwellenbach, J. et al., "Purification of Monoclonal Antibodies Using a Fiber Based Cation-Exchange Stationary Phase: Parameter Determination and Modeling," *Bioengineering*, 3(4):20 pgs (Dec. 2016).

\* cited by examiner

▲ : binding components
⬭ : stationary phase
$c_{Feed}$ : concentration feed solution
$c_l$ : concentration in liquid after saturation of stationary phase
$c_{Wash}$ : concentration in liquid unbound components in wash
$c_{Elu}$ : concentration in liquid under elution conditions
$q_{MA}$ : binding capacity stationary phase
t : residence time

CHROMATOGRAPHY METHOD, METHOD OF DETERMINING THE CONCENTRATION OF AT LEAST ONE COMPOUND IN A CHROMATOGRAPHY METHOD, METHOD OF OBTAINING AN ADSORPTION ISOTHERM, METHOD OF OBTAINING AT LEAST ONE STATIONARY PHASE AND METHOD OF EVALUATING THE ACCURACY OF A PREDETERMINED ADSORPTION ISOTHERM

CROSS REFERENCE TO RELATED APPLICATIONS

This is the U.S. National Stage of International Application No. PCT/EP2020/062856, filed May 8, 2020, which was published in English under PCT Article 21 (2), which in turn claims the benefit of European Patent Application No. 19176446.3, filed May 24, 2019, European Patent Application No. 19176462.0, filed May 24, 2019, and European Patent Application No. 19176467.9, filed May 24, 2019, which applications are incorporated herein in their entirety.

The present invention relates to a chromatography method, a method of determining the concentration of at least one compound in a chromatography method, a method of obtaining an adsorption isotherm, a method of obtaining at least one stationary phase and a method of evaluating the accuracy of a predetermined adsorption isotherm.

The analysis and modelling of mass-transfer mechanisms and kinetic phenomena involved during chromatographic operations is an important tool regarding scale-up purposes, quality-by-design approaches as well as process integration and optimization (Schwellenbach, Jan; Zobel, Steffen; Taft, Florian; Villain, Louis; Strube, Jochen (2016): Purification of Monoclonal Antibodies Using a Fiber Based Cation-Exchange Stationary Phase: Parameter Determination and Modeling. In Bioengineering (Basel, Switzerland) 3 (4). DOI: 10.3390/bioengineering3040024). Numerous mathematical models have been proposed to describe concentration profiles obtained during chromatographic operations, characterized by different complexity levels in the description of the relevant mass-transport phenomena.

The equilibrium between adsorption and desorption of compounds to and from the stationary phase in a chromatography process can be described by adsorption isotherms. An adsorption isotherm is an equation that relates the binding capacity q of a compound by the stationary phase to the concentration of the at least one compound in the mobile phase, i.e. an equation having the form $q=f(c)$. Thus, an adsorption isotherm may be determined by experimentally obtaining values for q at different concentrations, followed e.g. by using univariate regression so as to fit a predetermined function to the experimentally determined values for q.

However, apart from the concentration c of the compound in the mobile phase, the binding capacity may be influenced by other parameters, such as the composition of the mobile phase and the chromatography temperature (i.e. the temperature of the chromatography system including the compound as well as the stationary and mobile phases). Thus, an adsorption isotherm that is based on univariate regression, i.e. based on data wherein only the concentration c is varied while keeping the other relevant parameters constant, may fail in describing the adsorption/desorption equilibrium when the other relevant parameters vary.

As a solution to this problem, it has been proposed determining a plurality of adsorption isotherms $q=f(c)$ by means of univariate or multivariate regression such that the other relevant parameters are varied between the isotherms but parameters which are unconsidered by the isotherm itself are kept constant for each isotherm, followed by linearly interpolating the plurality of adsorption isotherms. Thereby, it is possible to obtain an adsorption isotherm that does not only take variations of the concentration c into account but that may in principle also be valid when other parameters vary, such as the composition of the mobile phase and the chromatography temperature.

However, in the above conventional methods, obtaining a reliable adsorption isotherm requires numerous experiments. Moreover, even if an adsorption isotherm is obtained based on numerous data points, the conventional methods for obtaining the adsorption isotherm from the data may yield a flawed result. Specifically, parameters influencing the binding capacity other than the concentration c may have a non-linear effect so that a linear interpolation may yield inaccurate results.

In view of the above, the technical problem underlying the present invention is to provide a method of obtaining an adsorption isotherm that should yield accurate and reliable results where the binding capacity of a compound by a stationary phase is influenced not only by the concentration of the compound in a mobile phase; to provide a method of evaluating the accuracy of a predetermined adsorption isotherm with the adsorption isotherm obtained in the above method; to provide a method of determining a concentration of a compound in a chromatography method that employs the obtained adsorption isotherm; a method of obtaining a stationary phase based on the method of obtaining an adsorption isotherm; and a chromatography method that employs the method of determining a concentration or the method of obtaining a stationary phase.

The solution to the above technical problem is achieved by providing the subject matter characterized in the claims.

In a first aspect, the present invention relates to a method of obtaining an adsorption isotherm of at least one compound comprising the steps of (ia) selecting the at least one compound; (ib) selecting a stationary phase; (ic) selecting a mobile phase; (id) selecting a temperature of the at least one compound, the stationary phase and the mobile phase; wherein at least one parameter, selected from parameters characterizing the composition of the mobile phase and the temperature, varies; (ii) obtaining a plurality of parameter value sets including the at least one varying parameter and the concentration of the at least one compound in the mobile phase; (iii) obtaining a plurality of binding capacity values of the at least one compound by the stationary phase for each of the plurality of parameter value sets obtained in step (ii); and (iv) obtaining the adsorption isotherm based on the plurality of binding capacity values obtained in step (iii) by means of multivariate data analysis.

Since the adsorption isotherm is obtained by means of multivariate data analysis (e.g. multivariate regression) in the method of the present invention, it is possible to obtain an adsorption isotherm that yields accurate and reliable results where the binding capacity of the at least one compound by the stationary phase is influenced not only by the concentration of the compound in the mobile phase but also by at least one parameter, selected from parameters characterizing the composition of the mobile phase and the temperature. That is, the method of the present invention does not merely give an adsorption isotherm that relates the binding capacity q of a compound by the stationary phase to the concentration of the at least one compound in the mobile phase, i.e. an equation having the form $q=f(c)$, but a more specific adsorption isotherm where the binding capacity q is further related to at least one further parameter $p_j$, i.e. $q=f(c,p_j)$. The at least one parameter p is selected from parameters characterizing the composition of the mobile phase and the temperature.

According to a preferred embodiment of the present invention, the multivariate data analysis includes a non-linear multivariate regression. Particularly preferably, the multivariate data analysis is a non-linear multivariate regression. Thereby, an accurate adsorption isotherm can be obtained by the method of the present invention even if the at least one varying parameter has a non-linear effect on the binding capacity.

The at least one compound selected in step (ia) is not particularly limited. For instance, it can be selected among small molecules (Mn≤8000 g/mol, determined by GPC based on polystyrene standards), drugs, proteins, nucleotides, nucleosides, biological cells, viruses, virus-like particles, antibody-drug conjugates, charge variance antibodies, antibody fragments, polyaminoacids and polypeptides. Preferably, the at least one compound comprises or is a protein and/or a drug.

The number of the at least one compound(s) selected in step (ia) is not particularly limited. Preferably, the number of the at least one compound(s) is 2 or more. When the number is at least 2, respective adsorption isotherms for two or more different compounds can be obtained, which makes it possible to determine whether a specific stationary phase is suited for separating the two or more compounds from one another. As a preferred upper limit for the number of compounds, a number of 20, preferably 10 may be mentioned.

According to the present invention, step (ib) is not particularly limited. In principle, any stationary phase that is suitable for chromatography can be used. Suitable stationary phases are, for instance, porous and non-porous spherical particles, porous and non-porous non-spherical particles, for example silica particles, chromatography resins, chromatography membranes, chromatography monoliths, membrane adsorbers, wovens, non-wovens and mixed matrices. According to the present invention, an ion-exchange chromatography membrane, a hydrophobic interaction membrane, an affinity membrane or a monolith bearing the same interaction modi as the ion-exchange chromatography membrane, hydrophobic interaction membrane and/or affinity membrane is preferably selected in step (ib).

According to the present invention, any mobile phase that can be used in a chromatography method can be selected in step (ic). The mobile phase is preferably liquid. Moreover, the mobile phase can include or be an organic solvent or a mixture of organic solvents. In addition to one or more organic solvents, the mobile phase can include water. Preferably, the mobile phase is an aqueous medium. The composition of the mobile phase may vary. For instance, when the mobile phase includes one or more organic solvents, the concentration of the one or more organic solvents may change. Moreover, when the mobile phase is an aqueous medium, the pH and/or the salt concentration of the mobile phase can vary.

According to the present invention, the pH of the mobile phase can in principle take any value. Preferably, the pH has a value of from 0 to 14, more preferably 2 to 12, particularly preferably 3 to 11, even more preferably 4 to 10, and most preferably 5 to 9. Of course, the pH may also be kept constant.

According to the present invention, the salt concentration of the mobile phase can in principle take any value, as long as the solubility of the salt(s) in the mobile phase is not exceeded. Preferably, the salt concentration has a value ranging from 0 to 10 mol/L, more preferably 0 to 5 mol/L, particularly preferably between 0 to 3 mol/L, most preferably 0 to 1 mol/L. Of course, the salt concentration may also be kept constant during the chromatography method.

According to the present invention, one or more salts may be dissolved in the mobile phase. The one or more salts are not particularly limited. Preferably, the one or more salts are selected from the group consisting of sodium chloride, potassium chloride, sodium sulfate, sodium carbonate, potassium sulfate, potassium dihydrogenphosphate, dipotassium hydrogenphosphate, ammonium sulfate, urea hydrochloride, guanidine hydrochloride, disodium hydrogenphosphate, sodium dihydrogenphosphate, tris(hydroxymethyl)aminomethane hydrochloride, glycine, trisodium citrate and combinations thereof. The mobile phase may alternatively or additionally contain the corresponding acids, such as hydrochloric acid, sulfuric acid, citric acid, etc.

In step (id) of the inventive method, a temperature of the at least one compound, the stationary phase and the mobile phase is selected. This temperature may be referred to as "chromatography temperature". This temperature is not particularly restricted. Preferably, the chromatography temperature is more than 0° C., more preferably at least 1° C., particularly preferably at least 5° C., even more preferably at least 15° C. The upper limit of the above temperature is preferably less than 100° C., preferably 80° C. or less, more preferably 70° C. or less, particularly preferably 60° C. or less, even more preferably 50° C. or less. The above temperature may vary, preferably within the above-specified ranges. Preferably, the above temperature is constant.

According to the present invention, at least one parameter $p_j$, selected from parameters characterizing the composition of the mobile phase and the temperature, varies. According to a preferred embodiment of the present invention, the parameters characterizing the composition of the mobile phase are selected from the group consisting of concentrations of solvents included in the mobile phase, pH, salt concentration, salt ions/buffer components, solubility agents, elution agents, displacement components, organic molecules, concentration of the at least one compound.

According to the method of the present invention, several varying parameters $p_j$ (j being an integer of one or more) that have an influence on the binding capacity can be taken into account. Thereby, it is possible to obtain a global adsorption isotherm $q=f(c,p_j)$ that accurately takes the effect of various varying parameters into account. According to a preferred embodiment of the present invention, the number of the at least one varying parameter is two or more. Although there is no upper limit for the number of varying parameters, it is preferred according to the present invention that this value is at most 10, more preferably at most 5, even more preferably at most 3, in view of the high complexity of the multivariate data analysis (e.g. multivariate regression) in step (iv) when the number of varying parameters is high.

It is preferred that the varying parameters include the pH and the salt concentration of the mobile phase. According to a particularly preferred embodiment of the present invention, the number of varying parameters $p_i$ is two and the two varying parameters $p_1$ and $p_2$ are the pH and the salt concentration of the mobile phase, respectively. Obtaining an adsorption isotherm that accurately takes the effects of the pH and the salt concentration into account is particularly helpful when the stationary phase is an ion-exchange membrane, a hydrophobic interaction membrane, a mixed mode membrane or an affinity membrane.

A plurality of parameter value sets is obtained in step (ii). According to the present invention, there is no specific limitation regarding the manner in which the parameter value sets are obtained, as long as the parameter value sets include values of the at least one varying parameter and of the concentration of the at least one compound in the mobile phase. Preferably, the parameter value sets consist of values of the at least one varying parameter and of the concentration of the at least one compound in the mobile phase.

According to a preferred embodiment of the present invention, the plurality of parameter value sets is obtained in step (ii) by means of experimental design. The use of experimental design in the method according to the present invention makes it possible carry out steps (ii) and (iii) in such a manner that certain desired criteria are satisfied. When experimental design is involved in the inventive method, it is possible to define certain desired characteristics, e.g. regarding the accuracy of the adsorption isotherm obtained in step (iv), and to determine the optimum and/or minimum number of parameter value sets to be obtained in step (ii) necessary for achieving the desired characteristics. For instance, the experimental design may be a D-, A-, E-, or G-optimal design according to the present invention. Moreover, the experimental design may be a Plackett-Burmann design or a definitive screening design (DSD), a Rechtschaffner design based on saturated fractions of $3^n$ factorial designs (according to Rechtschaffner; Technometrics 1967, Vol. 9, Issue 4. Pages 569 to 575) that supports all the first order interactions and quadratic terms, a central composite orthogonal (CCO) design composed of a full or fractional factorial design and star points, or a central composite face (CCF) design composed of a full or fractional factorial design and star points placed on the faces of the sides.

Further, the experimental design may be a Box Behnken or a three level RSM design. Here, all design points, except the center points, are located at the center of the edges of a hypercube, and are also on the surface of a sphere. The full quadratic model can be estimated.

Rechtschaffner, Box Behnken, CCO or CCF experimental designs are beneficial for the determination of non-linear interactions and particularly advantageous for modelling the behavior of an isotherm.

Preferably, the used design is able to consider linear, interaction and quadratic terms.

The experimental design may be a full factorial design or a fractional factorial design. When the experimental design is a full factorial design, a very high degree of accuracy of the adsorption isotherm in step (iv) can be obtained. When the experimental design is a fractional factorial design, the number of the plurality of parameter value sets obtained in step (ii) can be substantially reduced so that a lower number of binding capacity values need to be obtained in step (iii). This may strongly reduce the (experimental) effort for obtaining the binding capacity values so that a highly accurate global isotherm may be accessible without the need of determining an excessive number of binding capacity values in step (iii).

In step (iii) of the inventive method, a plurality of binding capacity values is obtained. Herein, the binding capacity q is understood as the proportion of the at least one compound that is adsorbed on the stationary phase instead of being located in the mobile phase and is expressed in mol/L (or in g/L). According to the present invention, the binding capacity values can be taken from existing or predetermined binding capacity values and/or determined by means of laboratory experiments in step (iii).

According to a preferred embodiment of the present invention, step (iii) involves one or more laboratory experiments. Specifically, batch experiments can be used, as they offer a low need for target molecule and can be automated. Other experiments based on uptake within a packed chromatography bed formed by the stationary phase under dynamic conditions can also be used as the resulting equilibrium data is identical but higher amounts of target molecule are required. It is preferred that all of the binding capacity values are obtained experimentally in step (iii).

According to a preferred embodiment of the present invention, the one or more laboratory experiments is/are carried out by high-throughput screening (HTS). Particularly preferably, all of the binding capacity values obtained in step (iii) are obtained experimentally by HTS.

In step (iv) of the inventive method, an adsorption isotherm is obtained based on the plurality of binding capacity values obtained in step (iii) by means of multivariate data analysis. By means of multivariate data analysis, which preferably is a multivariate regression, an equation having the form $q=f(c,p_j)$ and expressing the dependence of the binding capacity q on the concentration of the at least one compound c in the mobile phase and on the at least one parameter $p_j$ can be obtained. In case the number of the at least one parameters is two or more, the equation may be of the form $q=f(c,p_1, p_2, \ldots)$, as indicated above.

In multivariate regression, a first step (iv-1) may be to select at least one parameter equation. A following step (iv-2) may be to obtain parameters for the at least one parameter equation so as to fit each of the at least one parameter equation to the plurality of binding capacity values obtained in step (iii) as closely as possible. Step (iv-2) may be followed by a step (iv-3) of determining the quality of fit of each of the more than one fitted parameter equations and a step (iv-4) of selecting the fitted parameter equation having the best quality of fit as the adsorption isotherm, which is particularly preferred for cases where more than one parameter equation has been selected in step (iv-1). That is, step (iv) preferably includes the steps of (iv-1) selecting at least one parameter equation; (iv-2) fitting each of the at least one parameter equations to the plurality of binding capacity values obtained in step (iii). Optionally, in case more than one parameter equation has been selected in step (iv-1), the method may further include the steps of (iv-3) determining the quality of fit of each of the more than one fitted parameter equations; and (iv-4) selecting the fitted parameter equation having the best quality of fit as the adsorption isotherm. In case steps (iv-3) and (iv-4) are omitted, the fitted parameter equation obtained in step (iv-2) corresponds to the adsorption isotherm obtained in step (iv).

The adsorption isotherm obtained in step (iv) is not particularly limited. The adsorption isotherm may be a conventional adsorption isotherm such as a steric-mass-action (SMA) adsorption isotherm, a Langmuir adsorption isotherm or a Freundlich adsorption isotherm. In a similar manner, the parameter equation preferably selected in step (iv-1) is not particularly limited and may be a parameter equation based on a conventional adsorption isotherm such as a steric-mass-action (SMA) adsorption isotherm, a Langmuir adsorption isotherm or a Freundlich adsorption isotherm. Preferably, the parameter equation preferably selected in step (iv-1) corresponds to the adsorption isotherm obtained in step (iv) in parametric form.

A parametric form of an adsorption isotherm is a generalized version of the adsorption isotherm where certain constant values of the adsorption isotherm are represented by variable parameters in the parameter equation. Specific numerical values for the parameters can be obtained in the preferred fitting step (iv-2).

According to a preferred embodiment of the present invention, an SMA isotherm is obtained as the adsorption isotherm of step (iv). The SMA isotherm can be used in order to describe the adsorption of the at least one compound in dependence on influencing factors like the salt concentration and/or pH. An SMA isotherm can be determined as described in detail in Brooks, Clayton A.; Cramer, Steven M. (1992): Steric mass-action ion exchange. Displacement profiles and induced salt gradients. In AlChE J. 38 (12), pp. 1969-1978. DOI: 10.1002/aic.690381212; and in Journal of Chromatography A, 1233 (2012) 54-65 "Determination of parameters for the steric mass action model—A comparison between two approaches". The SMA isotherm is preferred when the stationary phase is an ion-exchange stationary phase, such as an ion-exchange resin or an ion-exchange chromatography membrane.

In the following equation, the electro neutrality in dependency of the steric factor $\sigma_i$ of the at least one compound, characteristic charge $v_i$ of the at least one compound and binding capacity of counter ions $q_1$ ($q_1$ is the binding capacity of the salt) as well as the binding capacity $q_i$ of the at least one compound are shown. In the formula, n is the number of the at least one compounds and $\Lambda$ is the ionic capacity of the chromatographic medium (stationary phase).

$$\Lambda = q_1 + \sum_{i=2}^{n+1} (v_i + \sigma_i) q_i$$

The ionic capacity $\Lambda$ of the chromatographic medium defines the number of ligands on the chromatographic backbone. The ionic capacity (or capacity of a chromatographic medium) $\Lambda$ can be determined by means of a chemical reaction of the ligands on the backbone with a characteristic component which binds to each of the ligands or by means of titration. For ion exchange chromatography (IEX), the ionic capacity $\Lambda$ is determined by titration of the charged ligands by the corresponding acid or base.

For a rapid equilibrium or in equilibrium state, the SMA isotherm can be written as in the following equation.

$$c_i = \frac{q_i}{K_i} \cdot \left( \frac{c_1}{\Lambda - \sum_{i=2}^{n+1} (v_i + \sigma_i) q_i} \right)^{v_i}$$

In the above equation, $c_i$ is the concentration of the at least one compound and $c_1$ is the salt concentration at the binding site.

The characteristic charge $v_i$ and the equilibrium constant k can be determined by the curve evaluation of the capacity factor log k' with the equation $$k' = \frac{1-\varepsilon_T}{\varepsilon_T} \cdot \left(\frac{q_i}{c_i}\right) = \frac{1-\varepsilon_T}{\varepsilon_T} \cdot K_i \left(\frac{\Lambda}{c_1}\right)^{v_i}$$

in the equation $$\log k' = \log\left(\frac{1-\varepsilon_T}{\varepsilon_T} \cdot K_i \cdot \Lambda^{v_i}\right) - v_i \cdot \log(c_1).$$

Using a linear regression of logarithmic capacity factor over logarithmic salt concentration results in the charge $v_i$ and equilibrium constant $K_i$ by slope and intercept. The steric factor $\sigma_i$ can be fitted by error minimization on the experimental results or calculated with the following equations for $c_i \to \infty$; $q_1 \to 0$:

$$\lim_{c_i \to \infty} q_i = q_i^{max} = \frac{\Lambda}{\sigma_i + v_i}$$

According to another preferred embodiment of the present invention, a Langmuir isotherm can be obtained in step (iv).

A Langmuir isotherm can be written for multiple components (i.e. in case there the number of the at least one compound is 2 or more) in the following form $$q_i = \frac{K_i \cdot q_{max,i} \cdot c_i}{1 + \sum_{j=1}^{n} K_{eq,j} \cdot c_j}$$

where $q_i$ represents the binding capacity for compound i, $K_i$ is the equilibrium adsorption constant, $q_{max,i}$ is the maximum binding capacity of the chromatographic medium and $c_i$ is the concentration of compound i in the mobile phase. Moreover, the sum $\Sigma_{j=1}^{n} K_j \cdot c_j$ includes all components present in the mobile phase that are able to adsorb to the stationary phase, including compound i.

Following the work published by Yamamoto et al. (Biotechnology and Bioengineering, Vol XXV, Pp. 1465-1583 (1983)) and Forrer (Nicola Forrer, "Antibody purification with ion-exchange chromatography", dissertation, ETH Zurich 2008), the Langmuir parameters, namely the maximum binding capacity $q_{max,i}$ and the equilibrium binding constant $K_i$, can be related to the salt concentration and/or pH within the fluid phase to describe the salt/pH dependent binding behavior. In the following equations, the salt concentration or the pH are expressed by $c_{mod}$.

$$q_{max,i} = a_1 \cdot c_{mod} + a_2$$

$$K_i = b_1 \cdot \exp(-b_2 \cdot c_{mod})$$

The parameters $a_1$, $a_2$, $b_1$ and $b_2$ are coefficients used to describe the salt or pH dependency of the isotherm parameters $q_{max,i}$ and $K_i$. If the isotherm parameters have been acquired for different salt concentrations, the coefficients can be determined by a least-square fit of the above shown functions to the salt dependent isotherm parameter data sets.

In case both the salt concentration as well as the pH are to be considered, the above equations can be expanded ($q_{max,i} = a_1 \cdot c_{mod,salt} + a_2 + a_3 \cdot c_{mod,pH} + a_4$).

The above modified Langmuir isotherm as presented in Biotechnology and Bioengineering, Vol XXV, Pp. 1465-1583 (1983) and "Antibody purification with ion-exchange chromatography", dissertation, ETH Zurich 2008, is herein referred to as Yamamoto-Langmuir isotherm.

According to the present invention, the fitting step (iv-2) is not particularly limited. The fitting can be achieved by means of a least-squares-fit, multivariate regression, such as multiple linear or non-linear regression, wherein multiple non-linear regression is preferred. Suited fitting methods are known to the skilled person. Such a fitting conventionally is carried out by making use of a fitting algorithm which is repeatedly carried out for a plurality of iterations.

In the fitting step (iv-2), each of the binding capacity values obtained in step (iii) can be used in a one-step fitting for obtaining the adsorption isotherm (or the at least one fitted parameter equation). By proceeding accordingly, the adsorption isotherm can be obtained in a single fitting step.

According to a preferred embodiment of the present invention, the fitting step (iv-2) includes a plurality of preliminary fitting steps (iv-2a), followed by a main fitting step (iv-2b).

In step (iv-2a), a plurality of preliminary adsorption isotherms is obtained, where for each preliminary adsorption isotherm, one or more of the at least one varying parameter is kept constant. In step (iv-2a), each of the preliminary adsorption isotherms is obtained by fitting a parameter equation to a part of the parameter value sets, wherein each of the parts of the parameter value sets is characterized in that one or more of the at least one varying parameter is kept constant. The same parametric equation is used for each of the preliminary fittings in step (iv-2a).

The parametric equation is not particularly limited and can be, for instance a conventional isotherm such as a Langmuir isotherm, an SMA isotherm, or a Yamamoto-Langmuir isotherm. Moreover, the parametric equation can be determined by means of experimental design in which the physical-chemical interactions are described by the experimentally found correlation between the observed parameter(s). According to the present invention, the parametric equation is preferably selected from a Langmuir isotherm, an SMA isotherm, a Yamamoto-Langmuir isotherm, or a parametric equation determined by means of experimental design, more preferably from a Langmuir isotherm, an SMA isotherm, or a parametric equation determined by means of experimental design, most preferably from a parametric equation determined by means of experimental design.

The respective parameters of the preliminary adsorption isotherms obtained in step (iv-2a) are taken as a basis in the main fitting step (iv-2b). That is, in the main fitting step (iv-2b), the (global) adsorption isotherm is obtained by fitting one parametric equation to the respective numerical values of each of the parameters of the fitted parameter equations obtained in step (iv-2a). The respective parametric equations used in the main fitting step are not particularly restricted. In principle, any parametric equation can be used for this task, as long as a satisfactory fit can be obtained. For instance, the parametric equation may consider linear terms, quadratic terms, cubic terms, interaction terms and the like. An example of such a parametric equation is presented in Example 10.

In case more than one of the at least one varying parameters are kept constant in step (iv-2a), several preliminary fitting steps are necessary, wherein the first preliminary fitting step is a fitting to the plurality of binding capacity values obtained in step (iii) and the second and subsequent preliminary fitting steps are fittings to the numerical values of the parameters of the fitted preliminary parameter equations obtained in the preceding preliminary fitting step. However, in order to keep the efforts for obtaining the adsorption isotherm within reasonable limits, at most three, preferably at most two, most preferably at most one of the at least one varying parameters should be kept constant. That is, the number of subsequent preliminary fitting steps is preferably at most 3, more preferably at most 2, even more preferably at most 1.

Although the reason is not known, it has been found that by carrying out one or more preliminary fitting steps (iv-2a) followed by a main fitting step (iv-2b), an adsorption isotherm having excellent accuracy can be obtained.

The method of the present invention may further include a step of determining the quality of fit of the adsorption isotherm. Determining the quality of fit after step (iv) may be carried out in a similar manner as the above step (iv-3). For both steps of quality control, the same methods may be used. For example, the quality of fit may be determined by means of methods such as goodness of fit, analysis of variance (ANOVA) and/or by using a correlation matrix. By means of the step of controlling the quality of the adsorption isotherm it can be assured that certain accuracy requirements are met.

According to the present invention, in case the quality is not satisfactory, the method according to the present invention may be carried on by returning to step (ii). That is, in case the determined quality is not satisfactory, further sets of parameter values can be added to the plurality of parameter value sets so as to obtain more information. Then, based on the supplemented plurality of parameter value sets, additional binding capacity values can be obtained. Having gained additional information in terms of one or more parameter value sets and corresponding binding capacity values, a more accurate isotherm may be obtained in step (iv).

In a further aspect, the present invention relates to a method of obtaining at least one stationary phase comprising the steps of (I) executing the method of obtaining an adsorption isotherm according to the present invention for m times, wherein m is an integer of 2 or more and the m executions differ from one another with respect to step (ib); and (II) selecting the at least one stationary phase based on the result of step (I).

Step (II) can be carried out by a human operator. Alternatively, step (II) can be automated, for instance by using a computer.

The complete description of a chromatographic process (e.g. a separation problem) by a mechanistic model is very beneficial with respect to parameter optimization and scale-up. The process window, which can be predicted, is directly correlated to the determined parameter space. Without the need for time and material consuming experimental effort on the pilot scale, an optimized stationary phase of the production scale can be directly predicted. By using optimized process parameter sets including an optimum stationary phase, the overall process efficiency can be improved. With respect to the approach disclosed herein, the experimental effort for obtaining an adsorption isotherm on the lab scale can also be significantly reduced. Based on a characterization of the used stationary phase, the validity of the disclosed approach can be confirmed and executed.

According to a preferred embodiment of the present invention, step (I) is carried out such that in each of the m executions, at least two different compounds are selected in step (ia) and in each of the m executions the at least two different compounds are the same. By this preferred embodiment, it is possible to find the best stationary phase for separating several compounds from one another.

In another aspect, the present invention relates to a chromatography method comprising the method of obtaining at least one stationary phase according to the present invention, and a step of (III) carrying out the chromatography using the at least one stationary phase selected in step (II).

According to the present invention, the respective adsorption isotherm of a plurality of different stationary phases can be determined. Based on the obtained result, the stationary phase having an adsorption isotherm that comes closest to a desired adsorption isotherm can be selected. It is also possible to select several stationary phases which may be the same or different from one another, e.g. in case the chromatography method includes several stages, each of which involves the use of a stationary phase.

The method of obtaining at least one stationary phase according to the present invention can be particularly useful in the development of chromatography processes. Frequently, an industrial chromatography process involves several chromatography stages, each of which makes use of a different chromatography column provided with a stationary phase, which may be the same or different. For optimum performance, the stationary phases need to be carefully selected. Once having developed such a multiple stage chromatography process, changing one of the carefully selected stationary phases may compromise the entire process. Nevertheless, it may turn out at a rather late stage of the chromatography process development that one or more of the stationary phases can no longer be used so that such an exchange of one or more stationary phases for another stationary phase becomes unavoidable. In such a case, it may be possible to find a proper substitute for the stationary phase to be exchanged by the method of obtaining at least one stationary phase according to the present invention with minimum efforts.

In yet a further aspect, the present invention relates to a method of evaluating the accuracy of a predetermined adsorption isotherm comprising the method of obtaining an adsorption isotherm according to the present invention and a step of comparing the predetermined adsorption isotherm with the adsorption isotherm obtained in step (iv).

As noted above, the method of obtaining an adsorption isotherm according to the present invention makes it possible to obtain an adsorption isotherm that is very accurate, i.e. that closely reflects the physical/experimental behavior of a stationary phase. Thus, once having obtained such a highly accurate adsorption isotherm, the accuracy of a predetermined adsorption isotherm can be readily evaluated by means of comparison. The predetermined adsorption isotherm is not specifically limited. For instance, it can be taken from the literature or can be determined anew by a general method of obtaining an adsorption isotherm.

In another aspect, the present invention relates to a method of determining a concentration of at least one compound in a chromatography method comprising the method of obtaining an adsorption isotherm according to the present invention and further comprising the steps of (v) selecting a chromatography device having a chromatography bed comprising the stationary phase and the mobile phase; and (vi) calculating a concentration c(z,t) of the at least one compound in the mobile phase at a predetermined location z of the chromatography device and at a predetermined time t based on the adsorption isotherm obtained in step (iv).

Based on the adsorption isotherm obtained by the method according to the present invention, the concentration c(z,t) can be accurately calculated.

Chromatography is a physical method of separation in which the components to be separated are distributed between two phases, one of which is stationary (stationary phase) while the other one (the mobile phase) moves in a predetermined direction.

The method of the present invention is not limited to a specific type of chromatography. For instance, the inventive method can be used for adsorption chromatography, affinity chromatography, column chromatography, displacement chromatography, elution chromatography, exclusion chromatography, frontal chromatography, gas chromatography, ion-exchange chromatography, isothermal chromatography, gel-permeation chromatography, liquid chromatography, normal-phase chromatography, partition chromatography, planar chromatography, programmed-flow chromatography, hydrophobic interaction chromatography, mixed-mode chromatography, programmed-pressure chromatography, programmed-temperature chromatography, pyrolysis-gas chromatography, reaction chromatography, reversed-phase chromatography, supercritical fluid chromatography, two-dimensional chromatography and the like. The method according to the present invention is particularly suited for ion-exchange chromatography, hydrophobic interaction chromatography, affinity chromatography and mixed-mode chromatography.

In the method of determining a concentration of at least one compound in a chromatography method according to the present invention, it is possible to determine the concentration or concentrations of one or more compounds depending on the time t during the process and the location z of the chromatography device/the chromatography bed. In this context, the location z of the chromatography device is along the above-mentioned predetermined direction in which the mobile phase moves during the chromatography. In the context of the present invention, it can be assumed that the concentration of the at least one compound does not vary in the two other directions x and y perpendicular to the direction z.

The method of the present invention enables the calculation of the concentration of at least one compound in a chromatography process. It is in principle possible to determine the concentration of any compound present in the mobile phase at any predetermined location z of the chromatography device and at any time t during the chromatography. Preferably, the concentration of the at least one compound is calculated at the outlet of the chromatography device for a plurality of points in time.

It is possible that the concentration of only one compound is calculated. However, it is preferable that the concentrations of two or more compounds are calculated. It is particularly preferred to calculate the respective concentration of at least two different compounds, wherein at least one compound is a target compound and the one or more further compounds are impurity compounds. Thus, it is for instance possible to determine by the method of the present invention whether the chromatography parameters selected in steps (ib) to (id) and (v) enable a satisfactory separation of the one or more target compound(s) from the one or more impurity compound(s).

According to the present invention, a satisfactory separation between a target compound and an impurity compound means that at all times t during the chromatography only one of the target compound and the impurity compound has a significant concentration in the mobile phase at the outlet of the chromatography device. That is, the target compound and the impurity compound leave the chromatography device essentially at different times t. A significant concentration is a concentration of at least 0.01 µmol/L, preferably at least 0.001 µmol/L, particularly preferably at least 0.0001 µmol/L.

The chromatography device selected in step (v) is not particularly limited. The chromatography device can have any size, from the laboratory scale, where the volume $V_b$ of the chromatography bed is at most 500 mL, preferably at most 100 mL, particularly preferably at most 20 mL, even more preferably at most 5 mL, to the industrial scale, where the volume $V_b$ of the chromatography bed is more than 500 mL, preferably at least 1 L, particularly preferably at least 5 L, even more preferably at least 10 L. Preferably, the volume $V_b$ is at least 0.01 mL, more preferably at least 0.1 mL, particularly preferably at least 0.5 mL. It is further preferred that the volume $V_b$ is at most 1000 L, more preferably at most 500 L. Preferably, the chromatography device has a volume $V_b$ of the chromatography bed of more than 500 mL.

Step (v) of the method according to the present invention is not limited to selecting a single chromatography device. One chromatography device or more chromatography devices may be selected in step (v). In case several chromatography devices are selected, the chromatography method can be referred to as a multi-stage chromatography method, wherein several chromatography devices are put in series. Moreover, the several chromatography devices can also be put in parallel. Each of the several chromatography devices may have the same or a different stationary phase. Preferably, several chromatography devices put in series are selected in step (v), each having a different stationary phase. The number of the several chromatography devices is not particularly restricted. Preferably, this number is at most 5, more preferably at most 4, most preferably at most 3.

Preferably, step (v) does not only include the selection of the chromatography device but also the selection of at least one tank, a liquid pump, a detector, a plurality of valves and a process control software (selection of chromatography set-up), without being limited thereto. The chromatography set-up may vary in its machinery and systems by the processing complexity. For instance, the tank can be omitted e.g. when the chromatography method is a continuous chromatography method. In the exemplary chromatographic set-up displayed in FIG. 18, the reciprocating pump P1 promotes the feed solution from the feed tank B1 to the chromatographic device, here a membrane adsorber MA1. The corresponding detector signal is detected preferably downstream of the chromatographic device MA1. Thereafter, the mobile phase is preferably collected in a tank B2 or further purified. Impurities are preferably directed to a waste collector (not displayed in FIG. 18).

According to the present invention, the composition of the mobile phase may vary during the chromatography method (gradient chromatography). For instance, when the mobile phase includes one or more organic solvents, the concentration of the one or more organic solvents may be changed during the chromatography. Moreover, when the mobile phase is an aqueous medium, the pH and/or the salt concentration of the mobile phase may vary during the chromatography method.

Regarding the stationary phase of the chromatography device selected in step (v), when speaking in terms of the stationary phase being constituted by a porous particulate material, the total porosity $\varepsilon_T$ of the chromatography bed can be divided into two terms:

Internal porosity/voidage $\varepsilon_p$: This term describes the internal voidage of the porous particles with respect to the total volume of the chromatography bed.

Bulk porosity/voidage $\varepsilon_b$: This term describes the voidage between the particles in the chromatography bed (flow channels) with respect to the total volume of the chromatography bed.

Both porosity values $\varepsilon_p$ and $\varepsilon_b$ can be added to yield the total porosity $\varepsilon_T$ of the chromatographic bed:

$$\varepsilon_T = \varepsilon_p + \varepsilon_b$$

The chromatography bed can be further characterized by the

Stationary phase porosity $\varepsilon_{sp}$: This term describes the internal voidage of a porous particle with respect to the total volume of the stationary phase.

$$\varepsilon_{sp} = \frac{\varepsilon_T - \varepsilon_b}{1 - \varepsilon_b} = \frac{\varepsilon_p}{1 - \varepsilon_b}$$

Not only stationary phases constituted by particulate materials can be described by the above parameters $\varepsilon_T$, $\varepsilon_p$, $\varepsilon_b$ and $\varepsilon_{sp}$ but also stationary phases in general, such as membranes, monoliths, non-wovens, wovens and other non-particular media. Depending on the structure of the stationary phase (matrix), the internal porosity $\varepsilon_p$ can equal zero, which leads to possible simplifications of the mass transport phenomena due to the absence of intra-matrix structure diffusion.

The values of the internal porosity $\varepsilon_p$, the stationary phase porosity $\varepsilon_{sp}$, the bulk porosity $\varepsilon_b$, and the total porosity $\varepsilon_T$ can be determined as explained in the following.

Inverse size exclusion chromatography (iSEC) is a widely used method to determine the voidage and porosity of chromatographic media in respect of the molecule size. A reference molecule (tracer molecule) for the inverse size exclusion chromatography has to be chosen. The size of the reference molecule should match the size of the at least one compound (e.g. a target molecule). It is preferred that the reference molecule does not interact with the stationary phase. Preferred molecule classes for the reference molecule, having a narrow and defined size distribution, are in particular but not limited to polysaccharides, polyacrylates, polystyrenes, polymethacrylates, polyacrylamides, latex beads. (Inverse size exclusion chromatography can additionally be used to calculate the pore size distribution using various models.)

A major analytical approach is represented by the conventional method of statistical moments. Applied to the chromatographic peaks resulting from a narrow rectangular pulse injection of the tracer into the system, this method is an effective approach to calculate the actual volume, voidage (porosity) and dispersion coefficient $D_{ax}$ of the chromatography bed.

Following the moment analysis technique, a voidage value, depending on buffer conditions and molecule size, can be calculated using the following approach:

$$\varepsilon = \frac{V}{F/\mu_p} \quad (1)$$

where $\varepsilon$ represents the volume fraction accessible for the tracer molecule (reference molecule), V the chromatography bed volume, F the volumetric flow rate and $\mu_p$, the first moment of a tracer peak.

For all signals, the first ($\mu_p$) and second ($\sigma_p^2$) moments can be measured and calculated as proposed by H. W. Haynes (A Model for the Application of Gas Chromatography to measurements of Diffusion in Bidisperse Structured Catalysts, AIChE J. 19 (1973) 1043-1046. doi:10.1002/aic.690190526) and corrected, if necessary, by subtracting the moments attributed to the extra-column volume of the chromatography device (such as a HPLC system).

This correction procedure can be performed by determining the first ($\mu_{HPLC}$) and second ($\sigma_{HPLC}^2$) moment of a tracer signal measured in the absence of the chromatographic medium. The respective value is then subtracted from the first ($\mu_{p,obs}$) and second ($\sigma_{p,obs}^2$) moment determined in the presence of the chromatographic medium to eliminate the influence of the chromatographic system (see the below formulae (4) and (5)).

$$\mu_{p,obs} = \frac{\int_0^\infty C_{d,i}(t) \cdot t \cdot dt}{\int_0^\infty C_{d,i}(t) \cdot dt} \quad (2)$$

$$\sigma_{p,obs}^2 = \frac{\int_0^\infty C_{d,i}(t) \cdot (t - \mu_{p,obs})^2 \cdot dt}{\int_0^\infty C_{d,i}(t) \cdot dt} \quad (3)$$

$$\mu_p = \mu_{p,obs} - \mu_{HPLC} \quad (4)$$

$$\sigma_p^2 = \sigma_{p,obs}^2 - \sigma_{HPLC}^2 \quad (5)$$

where $\mu_p$ and $\sigma_p^2$ are the first and second moment of the tracer peak. $\mu_{p,obs}$ and $\sigma_{p,obs}^2$ are attributed to the whole system, whereas $\mu_{HPLC}$ and $\sigma_{HPLC}^2$ correspond only to the extra column volume. $C_{d,i}(t)$ represents the concentration of the tracer i at a detector at time t. That is, the concentration $C_{d,i}(t)$ is detected by the detector.

If the chromatography bed has no internal porosity, the bulk porosity $\varepsilon_b$ can be directly obtained with respect to the used molecule size by applying formulae (1), (2) and (4). In this case, $\varepsilon_b = \varepsilon = \varepsilon_T$, $\varepsilon_p = 0$ and $\varepsilon_{sp} = 0$.

If the chromatography bed has an internal porosity EP and a stationary phase porosity $\varepsilon_{sp}$, the values of $\varepsilon_p$ and $\varepsilon_{sp}$ can be determined using the following approach:

Small tracer molecules can completely access the internal voidage $\varepsilon_p$, reflecting the stagnant phase, as well as the volume $\varepsilon_b$ in the larger transport channels, occupied by the mobile phase. The obtained boundary value for the accessible volume fraction reflects therefore the total voidage $\varepsilon_T$ of the chromatography bed. That is, in case a small molecule such as acetone is used as a tracer i, $\varepsilon = \varepsilon_T$ in formula (1).

Large tracer molecules i are completely excluded from the internal voidage $\varepsilon_p$. The obtained boundary values for the accessible volume fraction reflects the external voidage (bulk porosity) $\varepsilon_b$, which is occupied by the mobile phase. That is, in case a large molecule such as dextran having a weight-average molecular weight $M_w$ determined by size exclusion chromatography of 2 000 000 g/mol is used as a tracer i, $\varepsilon = \varepsilon_b$ in formula (1). Both boundary values are necessary to describe the stationary phase porosity of the chromatography bed $\varepsilon_{sp}$:

$$\varepsilon_{sp} = \frac{\varepsilon_T - \varepsilon_b}{1 - \varepsilon_b}$$

The same approach can be used for the internal porosity $\varepsilon_p$. Both values for the external and the total porosity are necessary for its calculation ($\varepsilon_p = \varepsilon_T - \varepsilon_b$).

The determination of $\varepsilon_p$ and $\varepsilon_{sp}$ needs therefore one tracer molecule with no accessibility to the internal porosity (such as dextran) and another tracer molecule with complete accessibility to the internal porosity (such as acetone). A combination of formulae (1), (2) and (4) makes it possible to calculate the value of $\varepsilon_p$ or $\varepsilon_{sp}$ as described in detail in J. Schwellenbach, S. Zobel, F. Taft, L. Villain, J. Strube, Purification of monoclonal antibodies using a fiber based cation-exchange stationary phase: parameter determination and modeling, Bioengineering 3 (2016) 24/1-24/20. doi: 10.3390/bioengineering3040024.

In case it is unknown whether the internal porosity $\varepsilon_p$ of the chromatographic bed is zero or not, the stationary phase is dealt with in accordance with the above method for determining the internal porosity $\varepsilon_p$. If $\varepsilon_p$ is zero, the experiments with the small and large tracer molecules will yield the same result for $\varepsilon$ in formula (1), i.e. $\varepsilon_b = \varepsilon_T$, and the resulting value for $\varepsilon_p$ according to the formula "$\varepsilon_p = \varepsilon_T - \varepsilon_b$" will be 0.

In case the stationary phase is constituted by a particulate material such as silica particles, the internal porosity $\varepsilon_p$ of the chromatographic bed reflects the porosity within the particles. Contrary thereto, the bulk porosity $\varepsilon_b$ is constituted by the space between the particles without taking the internal porosity $\varepsilon_p$ into account. The total volume accessible by the mobile phase (total porosity $\varepsilon_T$) is the sum of the bulk and internal porosities ($\varepsilon_T = \varepsilon_p + \varepsilon_b$).

The determination of these voidage values $\varepsilon_p$, $\varepsilon_{sp}$, $\varepsilon_b$, and $\varepsilon_T$ can be carried out for different compositions of the mobile phase and at different temperatures. For instance, different conditions with respect to salt concentration, pH and temperature can be used to determine a functional relation, as described in detail in the context of preferred step (v') of the inventive method.

According to a preferred embodiment, the method of determining a concentration of at least one compound in a chromatography method according to the present invention further includes a step of: (v') determining at least the flow velocity of the mobile phase in the chromatography bed v and the bulk porosity of the chromatography bed $\varepsilon_b$; wherein in step (vi), the calculation of the concentration c(z,t) is further based on the flow velocity v and the bulk porosity $\varepsilon_b$.

According to a preferred embodiment of the method of determining a concentration of at least one compound in a chromatography method according to the present invention, in the above step (v'), the axial dispersion coefficient $D_{ax}$ of the at least one compound in the chromatography bed is further determined and in step (vi), the calculation of the concentration c(z,t) is further based on the axial dispersion coefficient $D_{ax}$. Thus, according to the present invention, it is particularly preferred that the calculation of the concentration c(z,t) is further based on the flow velocity v, the bulk porosity $\varepsilon_b$, and the axial dispersion coefficient $D_{ax}$.

According to a preferred embodiment of the present invention, the stationary phase is reversibly swellable. A stationary phase is considered as "swellable" if a change of the composition of a mobile phase in contact with the stationary phase results in a change of the volume of the stationary phase. When the volume of the stationary phase changes, the porosity changes as well. Thus, according to the present invention, a stationary phase is considered as "swellable" if a change of the composition of a mobile phase in contact with the stationary phase results in a change of the internal porosity $\varepsilon_p$, the stationary phase porosity $\varepsilon_{sp}$ or the bulk porosity $\varepsilon_b$.

For instance, the change of the internal porosity $\varepsilon_p$, the stationary phase porosity $\varepsilon_{sp}$ the bulk porosity $\varepsilon_b$ can be at least 5%, preferably at least 10%, particularly preferably at least 15%. The change of the respective porosity is calculated based on the ratio of the larger porosity to the smaller porosity. A stationary phase is considered as "reversibly swellable" if the change of the porosity is reversible, i.e. if the original porosity before the change of the composition of the mobile phase in contact with the stationary phase can be restored by restoring the original composition of the mobile phase.

Conventional models postulate that the spatial structure of the stationary phase remains constant during the chromatography process. However, under certain conditions, such as a varying composition of the mobile phase or a varying chromatography temperature, the volume of the stationary phase may vary considerably, leading to a fluctuating porosity. Therefore, an improved accuracy can be obtained by taking these fluctuations into account.

Specifically, many chromatographic media show a reversible swelling depending on the surrounding conditions. A prominent example are ion-exchange membrane adsorbers or porous resins bearing a grafted charged hydrogel layer (Sartobind®, Fractogel® EMD). Depending on the salt concentration, the hydrogel layer can be fully expanded due to repulsive inter- and intrachain interactions at low salt concentrations or collapsed at high salt concentrations due to shielding effects (see FIG. 1). By taking such kind of behavior into account when modelling a chromatography method, the accuracy can be increased.

In view of the above, it is preferred in the method of determining a concentration of at least one compound in a chromatography method according to the present invention that in step (v'), the flow velocity v, the bulk porosity $\varepsilon_b$ and, optionally, the axial dispersion coefficient $D_{ax}$ are determined for different values of the at least one varying parameters, for instance for different salt concentrations and/or different pH values of the mobile phase; and that in step (vi), the calculation of the concentration c(z,t) is further based on the flow velocity v, the bulk porosity $\varepsilon_b$, and, optionally, the axial dispersion coefficient $D_{ax}$, while taking the results of step (v') into account. Thereby, variations of the stationary phase's spatial structure and its influence on the values of v, $\varepsilon_b$, and optionally $D_{ax}$ can be taken into account in step (vi) so that the accuracy of the method can be increased.

According to a preferred embodiment of the present invention, a gel, preferably a hydrogel, is formed on at least a part of the surface of the stationary phase when the mobile phase is contacted with the stationary phase. Here, a "gel" is considered as a non-fluid network that is expanded throughout its whole volume by the mobile phase. Preferably, the gel is formed on the entire surface of the stationary phase. A "hydrogel" is a gel expanded by a mobile phase that is an aqueous medium.

According to a preferred embodiment of the present invention, at least a part of the surface of the stationary phase is constituted by a polymer that is bound to the surface of a stationary phase support structure. The stationary phase support structure is not particularly limited and may have the form of a particle, bead or a porous membrane. Preferably, the entirety of the surface of the stationary phase is constituted by the polymer. According to a particularly preferred embodiment of the present invention, a gel is formed from the polymer when it comes into contact with the mobile phase, as described above. It is even more preferred that this gel is a hydrogel.

According to the present invention, it is preferred that the chromatographic bed has an internal porosity $\varepsilon_p$ of at most 0.90, preferably at most 0.50, particularly preferably at most 0.20, even more preferably at most 0.05, most preferably 0.01, for example 0.00. Moreover, it is preferred that the stationary phase has a bulk porosity $\varepsilon_b$ Of from 10 to 99, preferably of from 30 to 90, even more preferably from 45 to 80. The total porosity $\varepsilon_T$ is preferably 10 to 99, more preferably 30 to 90, particularly preferably 45 to 80.

The bulk porosity $\varepsilon_b$ can be determined as described above. The value of the flow velocity v can be calculated based on the following equation $$v = \frac{F}{A \cdot \varepsilon_b}$$

where F is the volumetric flow rate of the mobile phase (which is predetermined) and A is the cross-section area of the chromatography device selected in step (v). The value of A can be determined by a straightforward geometric calculation.

According to a preferred embodiment of the present invention, in step (v'), the axial dispersion coefficient $D_{ax}$ of the at least one compound in the chromatography bed is further determined for the varying composition of the mobile phase and/or for the varying chromatography temperature and in step (vi), the calculation of the concentration c(z,t) is further based on the axial dispersion coefficient $D_{ax}$. Based on the adsorption isotherm as well as the parameters v, $\varepsilon_b$ and $D_{ax}$, it is possible to perform step (vi) based on the equilibrium dispersive model described below.

The axial dispersion coefficient $D_{ax}$ of the at least one compound in the chromatography bed can be calculated based on the following equation $$D_{ax} = \alpha \cdot v$$

where $\alpha$ is a dispersivity factor. This factor can be determined by measuring the axial dispersion coefficient at different linear flow velocities via a linear regression as shown in Example 5. In a similar manner, the axial dispersion coefficient $D_{ax,DPF}$ of the at least one compound in the hypothetical DPF (distributed plug flow pipe) as described below can be calculated using the equation $D_{ax,DPF} = \alpha_{DPF} \cdot v$.

Alternatively, the axial dispersion coefficient $D_{ax}$ can be calculated from the following equation.

$$D_{ax} = \frac{vL}{Bo}$$

In the above equation, Bo is the Bodenstein number, v is the linear velocity and L is a characteristic length. The Bodenstein number is determined by a pulse tracer experiment in which the axial dispersion coefficient is either fitted to the experimental data with error minimization or using the moment analysis. The characteristic length is the chromatography bed height (see Octave Levenspiel; Traxer Technology Modeling of the Flow of Fluids ISBN: 978-1-4419-8073-1).

As an alternative, the axial dispersion coefficient $D_{ax}$ can be calculated from the following equations.

$$D_{ax} = HETP \cdot \frac{v}{2 \cdot \varepsilon_b}$$

$$HETP = \frac{\sigma_p^2}{L} \frac{v}{\varepsilon_b}$$

In the above equations, HETP is the Height Equivalent to one Theoretical Plate and v is as defined above. HETP can be determined by tracer experiments in which the variance $\sigma_p^2$, of the corresponding peak, at a given linear velocity v and characteristic length L (chromatography bed height) is used.

Moreover, it is further preferred that in step (v'), the internal porosity $\varepsilon_p$ of the chromatography bed and/or the stationary phase porosity $\varepsilon_{sp}$ is further determined for the varying composition of the mobile phase and/or the varying chromatography temperature in addition to v, $\varepsilon_b$ and $D_{ax}$, and in step (vi), the calculation of the concentration c(z,t) is based on V, $\varepsilon_b$, $D_{ax}$ as well as $\varepsilon_p$ and/or $\varepsilon_{sp}$. Based on the adsorption isotherm as well as the parameters v, $\varepsilon_b$, $D_{ax}$ and $\varepsilon_p/\varepsilon_{sp}$, it is possible to perform step (vi) based on the lumped pore model or the general rate model described below.

In step (v'), the above parameters can be determined for several compositions of the mobile phase (e.g. for several pH values and/or for several salt concentrations) and/or for several temperatures. Preferably, the chromatography temperature is kept constant so that only the composition of the mobile phase may vary, e.g. the salt concentration and/or the pH. For each varying parameter (e.g. temperature, pH, salt concentration), at least two, preferably at least three, more preferably at least four values are determined for v, $\varepsilon_b$ and optionally $D_{ax}$, $\varepsilon_{sp}$, and $\varepsilon_p$. The higher this number, the higher the accuracy of the inventive method. However, for the sake of efficiency, this number should be at most 10, preferably at most 7, particularly preferably at most 6.

According to a preferred embodiment, the values optionally to be determined for v, $\varepsilon_b$ and optionally $D_{ax}$, $\varepsilon_{sp}$, and $\varepsilon_p$ are obtained by experimental design. In this regard, substantially the same as outlined in the foregoing with respect to the corresponding preferred embodiment regarding step (ii) applies.

According to the present invention, the values of v, $\varepsilon_b$ and optionally $D_{ax}$, $\varepsilon_{sp}$ and $\varepsilon_p$ obtained in step (v') can be taken directly in step (vi). In that case, ranges of the varying composition of the mobile phase and/or the varying chromatography temperature can be defined where the respective values obtained in step (v') apply. For example, in case v was determined for an NaCl concentration of 2 mM and 4 mM, i.e. v(2 mM) and v(4 mM), v(2 mM) could be taken as the linear velocity for NaCl concentrations of up to 3.0 mM and v(4 mM) could be taken as the linear velocity for NaCl concentrations of more than 3.0 mM.

According to a preferred embodiment of the present invention, the values of v, $\varepsilon_b$ and optionally $D_{ax}$, $\varepsilon_{sp}$ and $\varepsilon_p$ determined in step (v') are interpolated and the values of v, $\varepsilon_b$ and optionally $D_{ax}$, $\varepsilon_{sp}$ and $\varepsilon_p$ as taken in step (vi) are based on the interpolation. According to the present invention, the interpolation can be carried out by defining a linear function for each two adjacent values of v, $\varepsilon_b$ and optionally $D_{ax}$, $\varepsilon_{sp}$ ad $\varepsilon_p$, i.e., in pictorial terms, by drawing a line between each two adjacent values of v, $\varepsilon_b$ and optionally $D_{ax}$, $\varepsilon_{sp}$ and $\varepsilon_p$.

Preferably, the interpolation is performed by fitting to a mathematical function, for instance a least squares fit. It is further preferred that the fit has an accuracy $R^2$ of at least 0.90, particularly preferably of at least 0.95. Suitable fitting functions can be selected among a linear function, a polynomial function, a logarithmic function such as log or ln, an exponential function, a Boltzmann function, etc.

In step (vi) of the inventive method, a concentration c(z,t) of the at least one compound in the mobile phase is calculated at a predetermined location z of the chromatography device and at a predetermined time t based on the adsorption isotherm. As already outlined above, the calculation in step (vi) may further be based on the flow velocity v, the bulk porosity $\varepsilon_b$ and the axial dispersion coefficient $D_{ax}$. In addition, the internal porosity $\varepsilon_p$ and/or the stationary phase porosity $\varepsilon_{sp}$ ay be taken into account.

According to a preferred embodiment of the present invention, in step (vi), c(z,t) is calculated based on the following equation $$\frac{\partial c(z,t)}{\partial t} = Z$$

wherein Z is a sum including the following terms $$-\frac{(1-\varepsilon_b)}{\varepsilon_b} \cdot \frac{\partial q(z,t)}{\partial t}$$

and $$-v\frac{\partial c(z,t)}{\partial z}$$

wherein
q(z,t) represents the binding capacity of the at least one compound by the stationary phase.

In this context, it has already been mentioned that the values of v, $\varepsilon_b$, $D_{ax}$ etc. may vary depending on the chromatography temperature and the composition of the mobile phase (salt concentration, pH). Therefore and since the chromatography temperature and the composition of the mobile phase may vary depending on the location in the stationary phase z and the time t, also the values of v, $\varepsilon_b$, $D_{ax}$ etc. may vary depending on the location in the stationary phase z and the time t, i.e. v=v(z,t), $\varepsilon_b=\varepsilon_b(z,t)$, $D_{ax}=D_{ax}(z,t)$ etc.

According to a preferred embodiment of the present invention, $$Z = -v\frac{\partial c(z,t)}{\partial z} - \frac{(1-\varepsilon_b)}{\varepsilon_b} \cdot \frac{\partial q(z,t)}{\partial t},$$

i.e. the concentration c(z,t) is calculated based on an equilibrium model.

A person skilled in the art is able to calculate c(z,t) based on the equation $$\frac{\partial c(z,t)}{\partial t} = Z$$

by relying on his background knowledge. Preferably, calculating c(z,t) based on the equation $$\frac{\partial c(z,t)}{\partial t} = Z$$

is carried out by using a computer, particularly preferably by a computer-based numerical method.

Preferably, the sum Z further includes the term $$+D_{ax}\frac{\partial^2 c(z,t)}{\partial z^2}$$

According to a preferred embodiment of the present invention, $$Z = -v\frac{\partial c(z,t)}{\partial z} + D_{ax}\frac{\partial^2 c(z,t)}{\partial z^2} - \frac{(1-\varepsilon_b)}{\varepsilon_b} \cdot \frac{\partial q(z,t)}{\partial t},$$

i.e. t concentration c(z,t) is calculated based on an equilibrium dispersive model.

According to another preferred embodiment of the present invention, the concentration c(z,t) is calculated based on a lumped pore model, according to which $$Z = -v\frac{\partial c(z,t)}{\partial z} + D_{ax}\frac{\partial^2 c(z,t)}{\partial z^2} - \frac{(1-\varepsilon_b)}{\varepsilon_b} = A \cdot k_{eff} \cdot (c - c_f)$$

with the provision that $$\varepsilon_{sp}\frac{\partial c_f(z,t)}{\partial t} + (1-\varepsilon_{sp})\frac{\partial q_f(z,t)}{\partial t} = A \cdot k_{eff} \cdot (c - c_f)$$

where $k_{eff}$ is the global mass-transfer coefficient, $c_f$ is the volume average value of the solute concentration in the stationary phase, $q_f$ is the volume average value of the solute concentration bound on the stationary phase, and A is the specific exchange area of the stationary phase.

The exchange surface area A and the effective film diffusion coefficient $k_{eff}$ can be combined into a single rate coefficient $k_{eff,A}$:

$$k_{eff,A} = A \cdot k_{eff}$$

The global mass-transfer coefficient $k_{eff}$ satisfies the following equation $$\frac{1}{k_{eff}} = \frac{1}{k_{ext}} + \frac{1}{k_{int}}$$

where $k_{ext}$ is the external mass transfer coefficient and $k_{int}$ is the internal mass transfer coefficient.

According to the general rate model and the lumped pore model, it is assumed that the surface of the stationary phase is covered with a stagnant layer/phase of the composition constituting the mobile phase. It is further assumed that the mobile phase forms a layer of laminar flow in proximity to the stagnant phase. Mass transport from the mobile phase to the stationary phase takes place through the layer of laminar flow and through the stagnant layer.

The external mass-transfer coefficient $k_{ext}$ characterizes the mass transport from the mobile phase to the stagnant phase surrounding the stationary phase and can be determined by an evaluation of the Sherwood number Sh:

$$Sh = \frac{k_{ext} \cdot d_P}{D_{bulk}}$$

where $d_p$ represents a characteristic diameter for the flow of the mobile phase, e.g. the pore diameter in a membrane. It can be determined using scanning electron microscopy or liquid-liquid displacement porosimetry. The parameter $D_{bulk}$ represents the molecular diffusion coefficient of the at least one compound.

According to the present invention, the Einstein-Stokes equation can be used to estimate the bulk diffusion coefficient $D_{bulk}$ based on the molecule radius r, the dynamic viscosity of the solvent η, the temperature T and the Boltzmann constant $k_B$:

$$D_{bulk} = \frac{k_B T}{6\pi \eta r}$$

Under defined conditions, the molecule radius r can be determined using dynamic light scattering. This method relies on the intensity fluctuation of scattered light caused by molecular motions in solution. This method also offers a direct access to the diffusion coefficient.

The solution viscosity η can be determined using a falling-sphere viscosimeter. Stokes' law is the basis of the falling-sphere viscometer, in which the fluid is stationary in a vertical glass tube. A sphere of known size and density is allowed to descend through the liquid. If correctly selected, it reaches terminal velocity, which can be measured by the time it takes to pass two marks on the tube. Electronic sensing can be used for opaque fluids. Knowing the terminal velocity, the size and density of the sphere, and the density of the liquid, Stokes' law can be used to calculate the viscosity of the fluid.

According to the present invention, Sh can be calculated based on the Schmidt (Sc) and Reynolds (Re) number (E. J. Wilson, C. J. Geankoplis, Liquid mass transfer at very low Reynolds numbers in packed beds, Ind. Eng. Chem. Fundam. 5 (1966) 9-14. doi:10.1021/i160017a002):

$$Sh = \frac{1.09}{\varepsilon_b} \cdot Sc^{0.33} \cdot Re^{0.33} \text{ for } 0.0015 < Re < 55$$

The Reynolds number Re is the dimensionless ratio of inertial forces to viscous forces within a fluid which is subjected to relative internal movement due to different fluid velocities, which is known as a boundary layer in the case of a bounding surface such as the interior of a pipe.

$$Re = \frac{\rho v L}{\mu} = \frac{vL}{\nu}$$

ρ is the density of the mobile phase (SI units: kg/m³)
v is the linear velocity of the mobile phase (m/s)
L is the height of the chromatography bed (m)
μ is the dynamic viscosity of the mobile phase (Pa·s or N·s/m² or kg/m·s)
ν is the kinematic viscosity of the mobile phase (m²/s).

The Schmidt number (Sc) is a dimensionless number defined as the ratio of momentum diffusivity (kinematic viscosity) and mass diffusivity, and is used to characterize fluid flows in which there are simultaneous momentum and mass diffusion convection processes.

$$Sc = \frac{\nu}{D} = \frac{\mu}{\rho D}$$

where:
ν is the kinematic viscosity of the mobile phase (m²/s)
D is the mass diffusivity (m²/s)
μ is the dynamic viscosity of the mobile phase (Pa·s or N·s/m² or kg/m·s)
ρ is the density of the mobile phase (SI units: kg/m³).

According to the present invention, the internal mass-transfer coefficient $k_{int}$, characterizing the "lumped" mass transport within the stagnant phase surrounding the stationary phase can be calculated as follows (E. Glueckauf, Theory of chromatography. VII. The general theory of two solutes following non-linear isotherms, Discuss. Faraday Soc. 7 (1949) 12. doi:10.1039/df9490700012):

$$k_{int} = 5\frac{D_{eff}}{R_p}$$

where $D_{eff}$ denotes the effective molecular diffusion coefficient within the stagnant phase, which can be calculated as described in K. Kaczmarski, D. Antos, H. Sajonz, P. Sajonz, G. Guiochon, Comparative modeling of breakthrough curves of bovine serum albumin in anion-exchange chromatography, J. Chromatogr. A. 925 (2001) 1-17. doi: 10.1016/S0021-9673(01)01035-4, and $R_p$ denotes the particle radius, which can be determined using scanning electron microscopy or liquid-liquid displacement porosimetry.

The effective diffusion coefficient $D_{eff}$ is often by an order of magnitude lower in a porous system like a chromatographic resin or the hydrogel layer of a membrane adsorber due to the movement in a constricted pore system. This can be summarized as the tortuosity factor $\tau$.

$$D_{eff} = \frac{D_{bulk}}{\tau}$$

Thus, based on the bulk diffusion coefficient $D_{bulk}$ and the tortuosity factor $\tau$, the effective diffusion constant $D_{eff}$ can be calculated.

Following the correlation published by Mackie and Meares (J. S. Mackie, P. Meares, The Diffusion of Electrolytes in a Cation-Exchange Resin Membrane. I. Theoretical, Proc. R. Soc. London. Ser. A. Math. Phys. Sci. 232 (1955) 498-509. http://rspa.royalsocietypublishing.org/content/232/1191/498.abstract.), the tortuosity factor can be calculated using the stationary phase porosity $\varepsilon_{sp}$:

$$\tau = \frac{(2-\varepsilon_{sp})^2}{\varepsilon_{sp}^2}$$

The stationary phase porosity $\varepsilon_{sp}$ can be determined as described above.

The parameter $k_{int}$ can be interpreted as a mass-transfer resistance caused by a flat diffusive layer with a thickness of $R_p/5$.

The above approach for calculating $k_{int}$ of stationary phases that are constituted by spherical porous particles can be transferred to stationary phases that are not constituted by spherical porous particles. Assuming that the stationary phase has a uniform distribution of adsorption sites on its surface and that the diffusive pathway a solute molecule of the at least one compound has to travel within the stagnant phase before reaching an adsorption site, can be denoted as $d_H/2$ (J. Schwellenbach, S. Zobel, F. Taft, L. Villain, J. Strube, Purification of monoclonal antibodies using a fiber based cation-exchange stationary phase: parameter determination and modeling, Bioengineering 3 (2016) 24/1-24/20. doi:10.3390/bioengineering3040024), $k_{int}$ can also be calculated based on the following equation:

$$k_{int} = 2\frac{D_{eff}}{d_h}$$

where $d_h$ denotes the thickness of the stagnant phase. In the case of a membrane adsorber, the stagnant phase can be interpreted as the hydrogel layer thickness. It can be calculated as follows:

$$d_h = \frac{(\varepsilon_{in} - \varepsilon_{ex}) \cdot V_b}{A_{spec} \cdot m}$$

where $d_h$ is the hydrogel layer thickness, $V_b$ the column volume, $A_{spec}$ the specific surface area, m the stationary phase mass and $\varepsilon_{in}$ and $\varepsilon_{ex}$ the porosity value obtained for a complete accessibility of the hydrogel layer, as seen for a small tracer molecule (e.g. acetone), and complete exclusion from the hydrogel layer, as observed for large tracer molecules with a hydrodynamic radius $r_H > 15$ nm (e.g. dextrane having a molecular weight Mn of 2,000,000 g/mol). The specific surface area $A_{spec}$ of the membrane adsorber can be determined via BET measurements.

According to yet another preferred embodiment of the present invention, the concentration c(z,t) is calculated based on a general rate model, according to which $$Z = -v\frac{\partial c(z,t)}{\partial z} + D_{ax}\frac{\partial^2 c(z,t)}{\partial z^2} - \frac{(1-\varepsilon_b)}{\varepsilon_b} \cdot A \cdot k_{ext} \cdot (c(z,t) - c_f(z,r,t))$$

where $k_{ext}$ is the kinetic coefficient of the at least one compound regarding to film transfer, $c_f$ is the concentration of the at least one compound in a pore or an adsorptive layer of the stationary phase and r is the radius of the stationary phase particles, which can be determined by scanning electron microscopy.

If the stationary phase porosity $\varepsilon_{sp}$ has a nonzero value, the following equation needs to be considered in the general rate model.

$$\varepsilon_{sp}\frac{\partial c_p(z,r,t)}{\partial t} = \varepsilon_{sp}\frac{D_{eff}}{r^2}\frac{\partial}{\partial r}\left(r^2\frac{\partial c_p(z,r,t)}{\partial r}\right) - (1-\varepsilon_{sp})\frac{\partial q(z,r,t)}{\partial t}$$

where $D_{eff}$ is the effective diffusion coefficient.

In addition to the above methods for determining mass transfer parameters such as $k_{eff}$, $D_{eff}$ etc., further methods are available for a direct or indirect assessment. This includes but is not limited to an evaluation of signals resulting from different chromatographic experiments (as described in E. C. Ladd, T. Hahn, J. Seiler, S. A. Oelmeier, I. Asen, C. Silberer, L. Villain, J. Hubbuch, Modeling and simulation of anion-exchange membrane chromatography for purification of Sf9 insect cell-derived virus-like particles, J. Chromatogr. A. 1429 (2016) 142-154), tracer signal evaluation or batch uptake experiments.

In numerous cases, a chromatography device does not only contain the stationary phase/chromatography bed. Ancillary elements, like valves, tubings, flow distributors, etc. may be present. These ancillary elements, i.e. parts of the chromatography device through which the mobile phase flows and which are different from the chromatography bed are referred to as "external system". The influences of these ancillary elements on the hydrodynamic properties of the chromatography device can be taken account of as described in the following.

According to a preferred embodiment of the present invention, in step (vi), the chromatography device can be treated as a combination of a hypothetical stirred tank (ST), a hypothetical distributed plug flow pipe (DPF or PFP) and the chromatography bed, wherein the DPF is arranged downstream of the ST and the chromatography bed is arranged downstream of the DPF, as displayed in FIG. 17. (Alternatively, the chromatography device can be treated as a combination of only one of a hypothetical stirred tank (ST) and a hypothetical distributed plug flow pipe (DPF or PFP) with the chromatography bed.) Thus, the external system is preferably treated as a series of an ST and a DPF (external system "ST+DPF"). That is, according to a preferred embodiment of the present invention, c(z,t) is calculated based on the following equations:

$$\frac{\partial c_{out}^{ST}}{\partial t} = \frac{F}{V_{ST}}\left(c_{in}^{ST} - c_{out}^{ST}\right)$$

$$\frac{\partial c^{DPF}\left(z^{DPF}, t\right)}{\partial t} = -v\frac{\partial c^{DPF}\left(z^{DPF}, t\right)}{\partial z^{DPF}} + D_{ax}^{DPF}\frac{\partial^2 c^{DPF}\left(z^{DPF}, t\right)}{\partial \left(z^{DPF}\right)^2}$$

$$\frac{\partial c(z, t)}{\partial t} = -\frac{(1-\varepsilon_b)}{\varepsilon_b} \cdot \frac{\partial q(z, t)}{\partial t} - v\frac{\partial c(z, t)}{\partial z} + D_{ax}\frac{\partial^2 c(z, t)}{\partial z^2}$$

wherein $$V_{SYS} = V_{ST} + V_{DPF}$$

$$c(t=0, z) = 0$$

$$c_{out}^{ST} = c^{DPF}\left(z^{DPF}=0, t\right) = c_{in}^{DPF}(t)$$

$$c^{DPF}\left(z^{DPF}=z_{max}^{SPF}, t\right) = c_{out}^{DPF} = c(z=0, t)$$

In the above equations, $z^{DPF}$ is the location in the (hypothetical) DPF, $z_{max}^{DPF}$ is the maximum value that $z^{DPF}$ can take (outlet of the DPF), z is the location in the chromatography bed, $c_{in}^{ST}$ is the concentration of the at least one compound at the inlet of the (hypothetical) ST, $c_{out}^{ST}$ is the concentration of the at least one compound at the outlet of the ST, $V_{ST}$ is the volume of the ST, F is the volumetric flow rate of the mobile phase through the ST, $c^{DPF}$ is the concentration of the at least one compound in the DPF, $c_{in}^{DPF}$ is the concentration of the at least one compound at the inlet of the DPF, $c_{out}^{DPF}$ is the concentration of the at least one compound at the outlet of the DPF, c(z=0, t) is the concentration of the at least one compound at the inlet of the chromatography bed, $D_{ax}^{DPF}$ is the axial dispersion coefficient of the DPF, which can be determined in a similar manner as the dispersion coefficient of the chromatography bed $D_{ax}$, $V_{SYS}$ is the total volume of the chromatography device which is accessible to the mobile phase except for the volume of the chromatography bed $V_b$, $V_{ST}$ is the volume of the stirred tank, and $V_{DPF}$ is the volume of the DPF. The further expressions are as defined above.

According to this preferred embodiment, the contribution of the external system is condensed in front of the column, meaning that the exit of the hypothetical stirred tank equals the inlet of the hypothetical DPF/PFP, and the exit of the DPF/PFP equals the inlet of the chromatography bed (see FIG. 17).

$V_{SYS}$ can be determined based on the geometry of the chromatographic apparatus. Specifically, $V_{SYS}$ can be determined in the absence of the chromatographic medium by applying an analysis of the first moment of a tracer signal.

$$V_{SYS} = F\mu_p$$

where F represents the volumetric flow rate and $\mu_p$ the first moment of a tracer peak, as already mentioned above. A regression of the complete concentration profile of a tracer substance leaving the system after a pulse injection leads to the complete parameter sets necessary to describe the fluid dynamic behavior of the external system. If a combination of St and DPF is used to describe the behavior, an error minimization fitting procedure leads to $D_{ax}^{DPF}$, $V_{ST}$ and $V_{DPF}$.

As noted above, the calculation of c(z,t) in step (vi) may be based on partial differential equations (PDE, depending on time and space). To solve these equations, the PDEs can be transformed into ordinary differential equations (ODE). This is commonly done by describing the space dependency by a numerical method. One PDE is then transformed into k ODEs, where k is the degree of discretization. The numerical method used can be (but is not limited to) a finite difference method, orthogonal collocation or orthogonal collocation on finite elements.

In most cases, the resulting system of k ODEs cannot be solved analytically. A state of the art approach is the numerical integration at discrete time steps. Various different integration methods exist and can be used depending on the requirements. These are, but not limited to, implicit Euler method, explicit Euler method, variable step implicit Euler method and Runge-Kutta method.

Various commercial software bundles offer the possibility to solve the above PDE systems on which the calculation of c(z,t) in step (vi) may be based. These include Aspen Custom Modeler®, MatLab®, ChromX®, CADET®, GE PROMPS®.

In a further aspect, the present invention relates to a chromatography method comprising the above method of determining the concentration of at least one compound in a chromatography method, and a step of (vii) carrying out the chromatography.

According to a preferred embodiment of the present invention, step (vi) includes calculating the concentration of the compound in the mobile phase at the outlet of the chromatography device $c_{out}(t)$ at several points in time t and step (vii) includes collecting the mobile phase at a time t where $c_{out}(t)>0.0$ mmol/L, preferably where $c_{out}(t)>0.00$ mmol/L. According to the present invention, the breakthrough curve of the at least one compound can be calculated in step (vi) and the mobile phase can be collected in accordance with the calculated breakthrough curve. It is particularly preferred that the mobile phase is collected at a time t where $c_{out}(t)$ is a significant concentration, i.e. a concentration of at least 0.01 µmol/L, preferably at least 0.001 µmol/L, particularly preferably at least 0.0001 µmol/L.

By using the above method, the concentration c(z,t) can be reliably predicted so that the chromatography method can be controlled or adapted in accordance with the result for c(z,t) obtained in step (vi). This can be of particular relevance in industrial chromatography processes. In many cases, industrial chromatography processes employ a plurality of chromatography devices put in series. (In terms of the above-described preferred embodiment regarding step (v) of the inventive method, several chromatography devices are selected in step (v) in industrial processes of this kind.) Conventionally, the process parameters for such an industrial process, including the various stationary phases, the composition of the mobile phase, etc., are well-balanced. In case the predetermined process conditions are not satisfied, the whole multi-stage process may be compromised, possibly leading to a loss of the compound to be purified by means of the chromatography process. Nevertheless, in such a well-balanced industrial process where a plurality of chromatography devices put in series, it may occur that the predetermined process conditions are not met, e.g. due to a temporary system failure and/or a human error. For example, the salt concentration, the pH, the temperature or another relevant parameter may be beyond the desired limits. Conventionally, in view of the generally delicate balance of multi-stage chromatography processes, such a failure may be difficult if not impossible to be compensated for.

However, the chromatography method of the present invention makes use of an adsorption isotherm wherein the effect of the composition of the stationary phase and/or the temperature on the binding capacity of the stationary phase is taken into account. Therefore, in case of a temporary system failure and/or a human error, it may be possible to promptly determine an appropriate means for compensating the error, e.g. by modifying the composition of the mobile phase and/or the chromatography temperature. A corresponding control or feedback loop can be integrated into a chromatography method by using publicly available software such as SIMCA from Sartorius AG.

According to a preferred embodiment of the present invention, step (vii) includes monitoring the values of the at least one varying parameter in the chromatography method. The at least one varying parameter can be monitored in any way known to the skilled person, e.g. by means of a measurement using one or more sensors. According to the present invention, only some or all of the at least one varying parameters may be monitored.

Preferably, step (vii) further includes determining for one or more of the monitored values whether a respective predetermined criterion is satisfied and, in case the respective predetermined criterion is not satisfied, modulating one or more of the at least one varying parameters in the chromatography method based on the adsorption isotherm obtained in step (iv). Based on the information provided by the adsorption isotherm, a proper modulation (change) of one or more of the at least one varying parameters may be determined in order to compensate for the predetermined criterion not being satisfied. For instance, the predetermined criterion may be a salt concentration in the mobile phase and the modulated parameter may be a pH of the mobile phase, or vice versa.

The present invention provides a method for rapidly obtaining an accurate and reliable global adsorption isotherm. The obtained adsorption isotherm may be used for determining the concentration of at least one compound in a chromatography method, for obtaining at least one stationary phase for a chromatography method, for evaluating the accuracy of a predetermined adsorption isotherm and in a chromatography method.

FIG. 1 shows schematically the reversible swelling behavior of a charged hydrogel layer depending on the salt concentration of the mobile phase.

FIG. 2 displays porosity values $\varepsilon(c_S)$ determined for a dextrane 2000 kDa molecule on a Sartobind® Q Nano module depending on the salt concentration $c_S$.

FIG. 3 shows the dependence of the accessible volume fraction depending on the tracer molecule size, here pullulane in 10 mM KPi buffer at pH 7, 10 mM NaCl (see Example 2), wherein the hydrodynamic radius $r_H$ of the respective compound was determined as described in S. Viel, D. Capitani, L. Mannina, A. Segre, Diffusion-ordered NMR spectroscopy: A versatile tool for the molecular weight determination of uncharged polysaccharides, Biomacromolecules. 4 (2003) 1843-1847. doi:10.1021/bm0342638.

FIG. 4 displays stationary phase porosity values $\varepsilon_{sp}$ determined for Fractogel EMD $SO_3^-$ (M) depending on the salt concentration and a corresponding fit to a Boltzmann function (see Example 2).

FIG. 5 displays bulk porosity values $\varepsilon_b$ determined for Fractogel EMD $SO_3^-$ (M) depending on the salt concentration and a corresponding fit to a Boltzmann function (see Example 2).

FIG. 8 shows a size exclusion chromatogram for a cell culture supernatant fraction eluted from Sartobind® S after equilibration of 8 hours of Example 3a.

FIG. 16 (b) shows the dependence of the equilibrium binding constant on the salt concentration of Example 8.

FIG. 16 (c) shows the dependence of the maximum adsorbent capacity on the salt concentration of Example 8.

Figure 19:
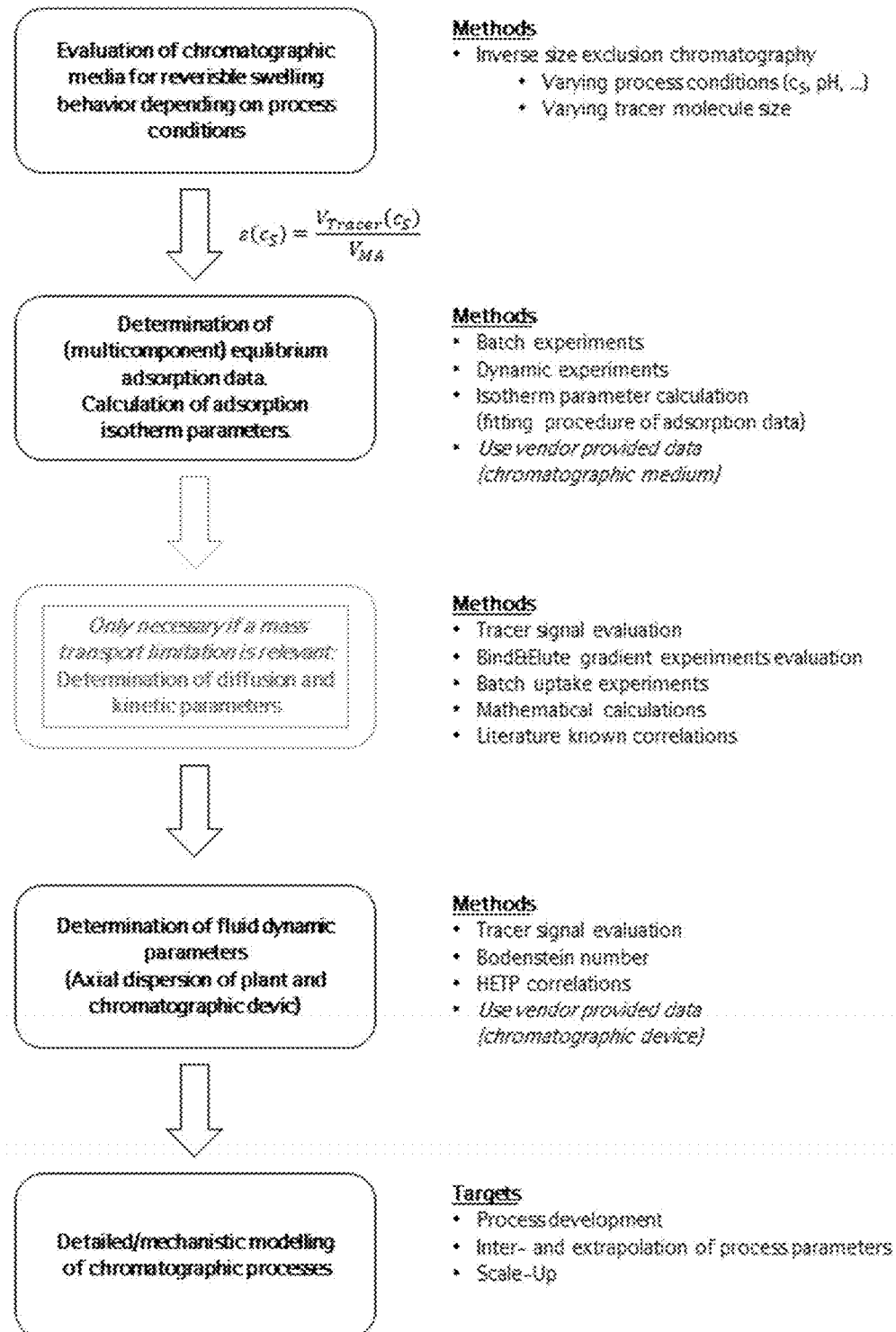

FIG. 19 schematically shows a preferred embodiment of the present invention.

Figure 20:
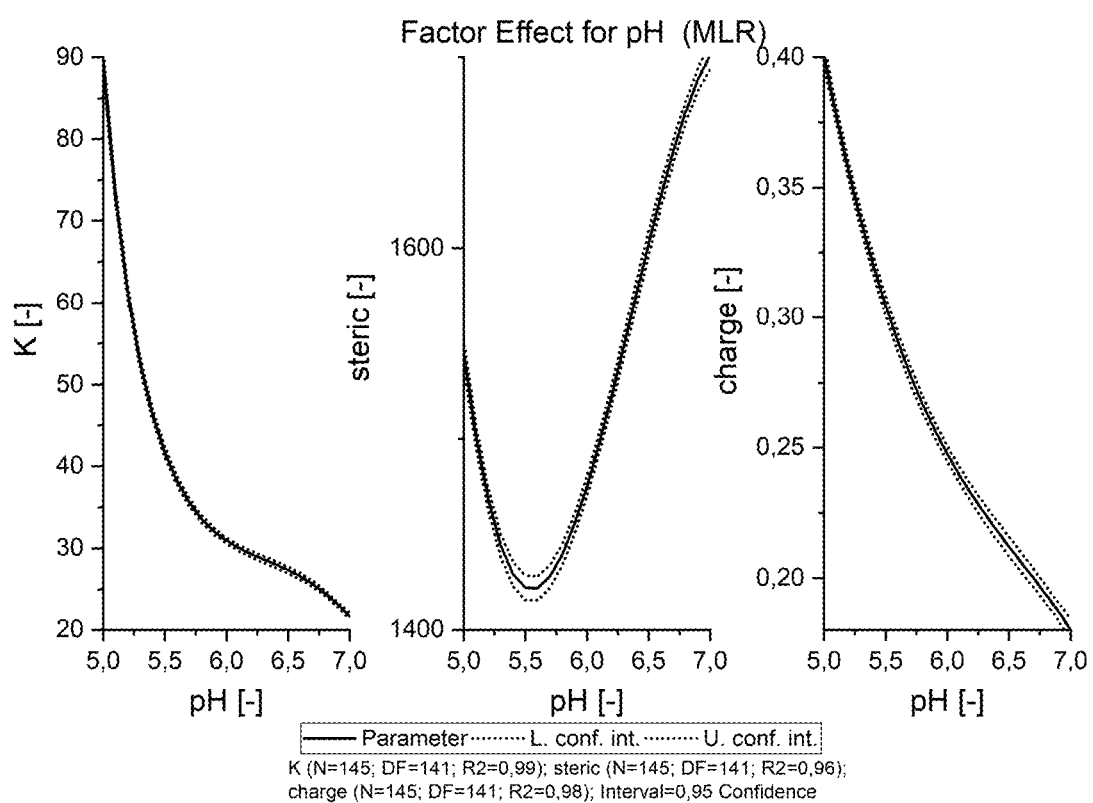

FIG. 20 shows results of Example 10.

The present invention is further illustrated by means of the following non-limiting Examples.

EXAMPLES

Example 1: Determination of Porosity Data Depending on Process Conditions (Step (v'))

The determination of a reversible swelling behavior can be easily performed using inverse size exclusion chromatography (iSEC) while varying the desired process conditions. Here, a specific example is given.

The stationary phase was a Sartobind® S membrane adsorber. Being a membrane adsorber, Sartobind® S has no internal porosity ($\varepsilon_b = \varepsilon_T$). It shows a pronounced reversible swelling behavior originating from its charged hydrogel surface modification. The chromatography device was a 3 mL ($V_b = 3$ mL) Sartobind® Nano with 8 mm bed height.

The dead volume $V_{Dead}$ of the chromatography apparatus was determined by using 5 µL injections 0.25 g/L dextran ($M_w$=2000 kDa, determined by size exclusion chromatography), determined by the RI detector without the chromatographic device with 0.319±0.03 mL. The peak maxima and the first momentum analysis, respectively, was used to determine the dead volume. The chromatography device had a dead volume of 1 mL.

For the iSEC experiments the used buffer was 10 mM potassium phosphate buffer (KPi) buffer at pH 7. The salt concentration (NaCl) was varied from 0.01 to 0.8 M. The membrane adsorber (MA) was equilibrated for 15 membrane volumes with the desired salt concentration before being loaded with 50 µL injections 0.5 g/L dextran 2000 kDa. The resulting peak response was recorded using an IR detector.

The porosity ε was determined based on the following equation.

$$\varepsilon = \frac{V}{F/\mu_p}$$

Figure 1:
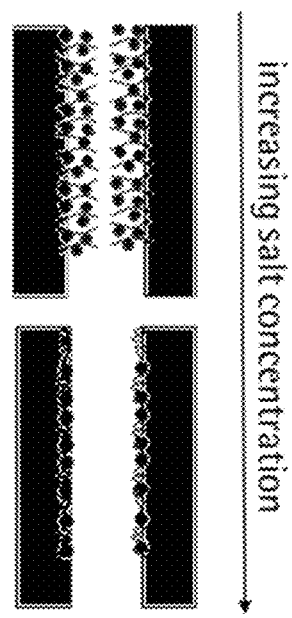
Figure 2:
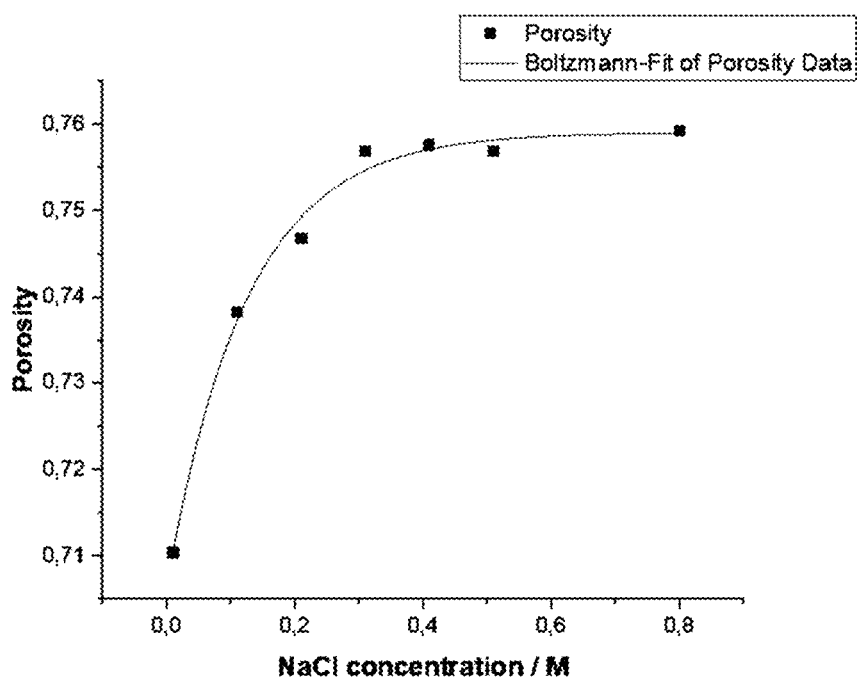

The obtained porosity values depending on the used salt concentration are shown in FIG. 2.

The data set was fitted using a Boltzmann function as shown in the following.

$$y = \frac{A_1 - A_2}{1 + e^{(x-x_0)/dx}} + A_2$$

The fit parameters were determined as follows:

| Parameter | Value |
| --- | --- |
| $A_1$ | −54.022 |
| $A_2$ | 0.759 |
| $x_0$ | −0.865 |
| dx | 0.125 |

Example 2: Determination of Porosity Data Depending on Process Conditions (Step (v'))

Figure 3:
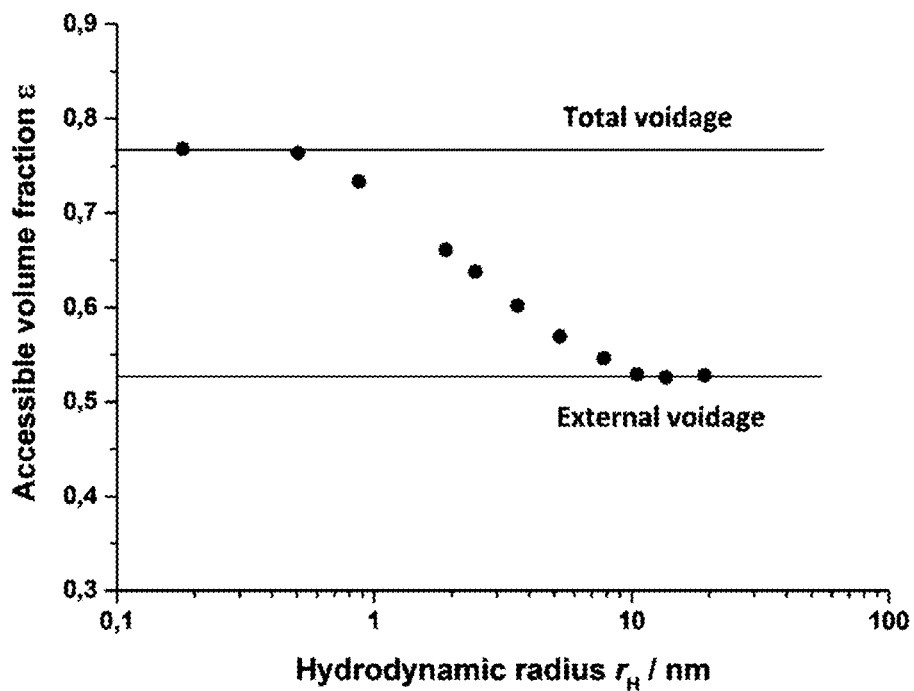

In the case of chromatographic media having an external and internal porosity, both values can be determined using reverse size exclusion chromatography as described above. Chromatographic media having an internal porosity show a different accessible volume fraction of the chromatographic bed depending on the tracer molecule size. An example for Fractogel EMD $SO_3^-$ (M) is shown in FIG. 3.

The stationary phase porosity $\varepsilon_{sp}$ can be calculated using the total porosity $\varepsilon_T$ and the external porosity $\varepsilon_b$ (voidage).

$$\varepsilon_{sp} = \frac{\varepsilon_T - \varepsilon_b}{1 - \varepsilon_b}$$

Figure 4:
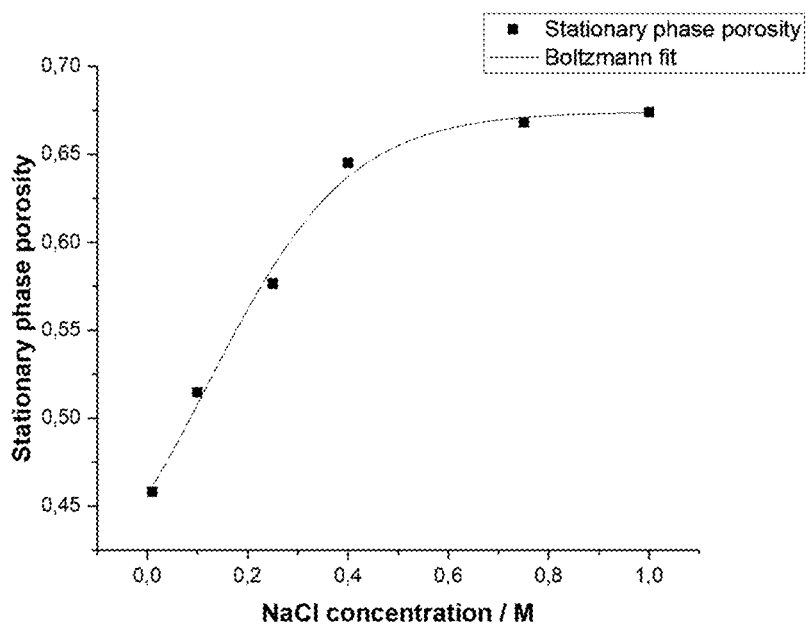
Figure 5:
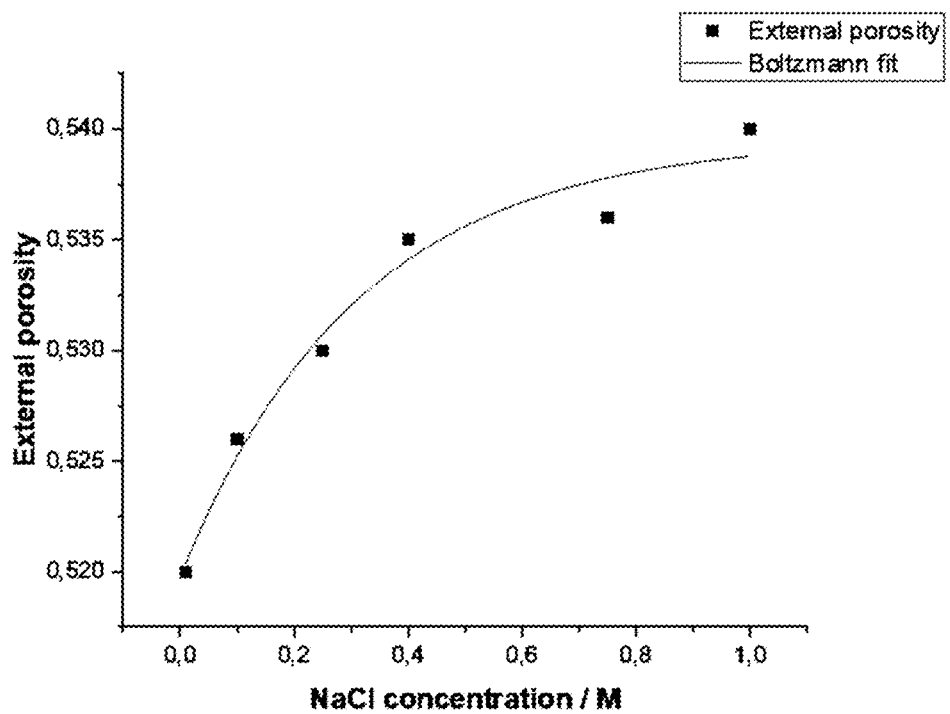

The total porosity $\varepsilon_T$ is accessible by a tracer molecule with complete accessibility of the internal porosity. In this example, acetone was used. A tracer molecule completely excluded can determine the bulk porosity $\varepsilon_b$. In this example, dextran having a molecular weight $M_w$ of 2000 kDa was used. Using the above equation, the values obtained for $\varepsilon_T$ and $\varepsilon_b$ can be used to calculate the stationary phase porosity $\varepsilon_{sp}$ depending on the salt concentration. The obtained values for $\varepsilon_{sp}$ (stationary phase porosity) and $\varepsilon_b$ (external porosity) including Boltzmann fit and the corresponding parameters are shown in FIGS. 4 and 5.

Stationary phase porosity $\varepsilon_{sp}$:

| Parameter | Value |
| --- | --- |
| $A_1$ | 0.365 |
| $A_2$ | 0.674 |
| $x_0$ | 0.122 |
| dx | 0.140 |

Bulk porosity $\varepsilon_b$:

| Parameter | Value |
| --- | --- |
| $A_1$ | −72.89 |
| $A_2$ | 0.539 |
| $x_0$ | −2.548 |
| dx | 0.31 |

An excellent fit was obtained for both porosity values $\varepsilon_b$ and $\varepsilon_{sp}$ when using a Boltzmann function.

Example 3: Acquiring Equilibrium Adsorption Data (Step (iii))

In Example 3, equilibrium adsorption data for bovine serum albumin (BSA) on Sartobind® Q was obtained.

Figure 6:
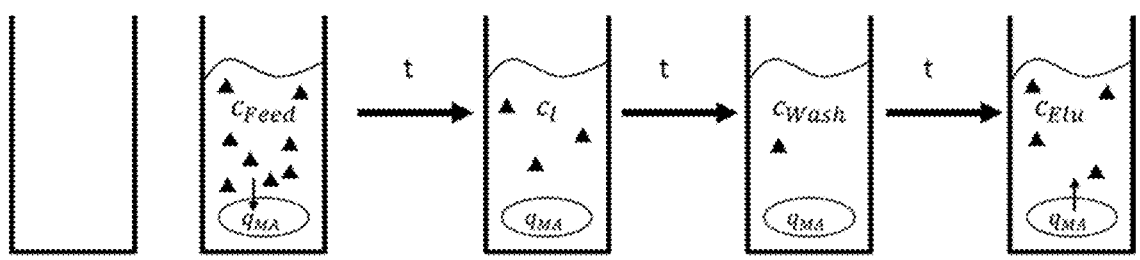
FIG. 6 shows the isotherm determination workflow of Example 3.

Determination of equilibrium adsorption data based on batch experiments as shown in Antibodies 2018, 7(1), 13; https://doi.org/10.3390/antib7010013, "Evaluation of Continuous Membrane Chromatography Concepts with an Enhanced Process Simulation Approach", Zobel, Stein, Strube, for Sartobind® Q, mean pore diameter of 3 µm and a ligand density of $$2 - 5 \frac{\mu eq}{cm^2},$$

was carried out with 0.1-5 g/L bovine serum albumin (BSA). The used buffer was 20 mM TRIS HCl buffer, at pH=7, with NaCl concentrations of 0 to 0.3 M NaCl. The pH-value was adjusted using HCl or NaOH. The round Sartobind® Q membrane adsorber (MA) sample with a diameter of 20 cm and a height of 0.024-0.028 cm was equilibrated 30 min in 20 mM TRIS HCl buffer with the respective pH and salt concentration. The volume of the buffer was 200 times the volume of the MA. After an equilibration time of 30 minutes, the MA was dabbed with paper and transferred in a 12 well plate cavity. The BSA was dissolved in TRIS HCl buffer corresponding to the experiment pH and salt concentration. The concentration of the BSA feed solution was measured by UV/Vis spectroscopy at 280 nm and added with 4 mL to the MA in the 12 well plate. After a residence time of at least 8 h the supernatant concentration was measured, the MA was again paper dabbed and transferred in a new well plate. Subsequently, the MA was eluted with 4 mL 20 mM TRIS HCl and 1 M NaCl for at least 4 h. The supernatant concentration was measured after the 4 h elution time. The foregoing process is schematically depicted in FIG. 6.

Figure 7:
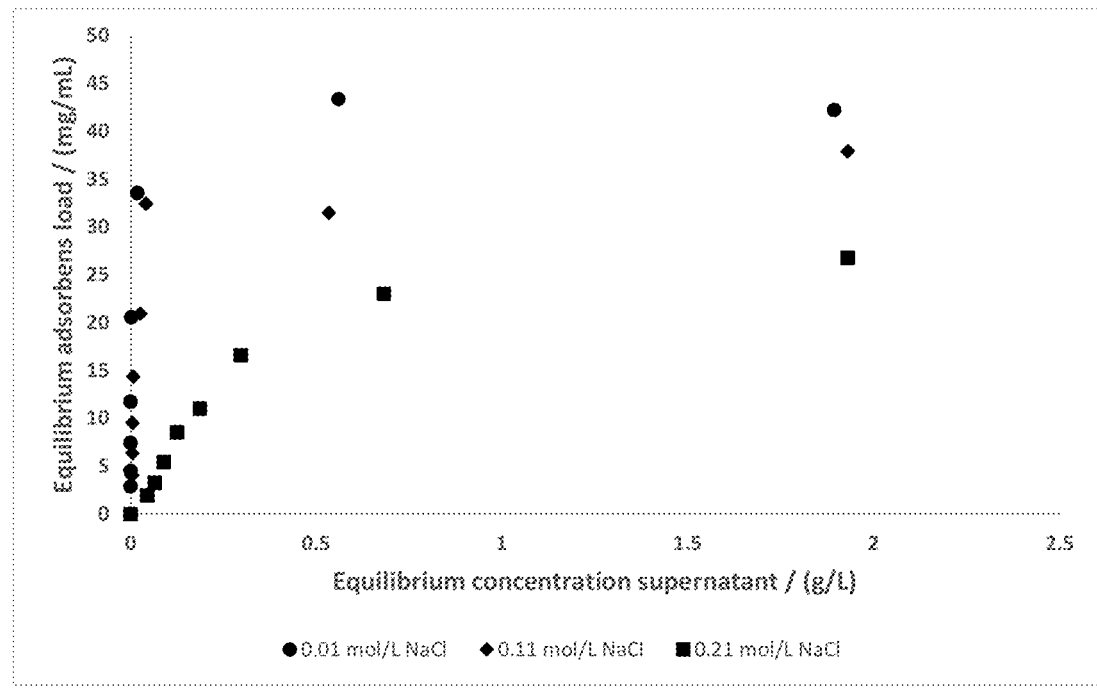
FIG. 7 shows equilibrium adsorption data for bovine serum albumin on Sartobind® Q of Example 3.

The obtained data sets for three different salt concentrations are shown in FIG. 7.

Example 3a: Acquiring Equilibrium Adsorption Data for Several Compounds

The method of Example 3 is also viable for multicomponent analysis. A prominent example is the simultaneous determination of equilibrium adsorption data for monoclonal antibodies (mAb) as well as their aggregates and contaminants. The batch experiments can be carried out in the same way but the supernatant and the elution has to be analyzed in a way that allows distinguishing between all components (mAb monomer, aggregates and further contaminants). For example, this can be achieved by size exclusion chromatography.

Figure 8:
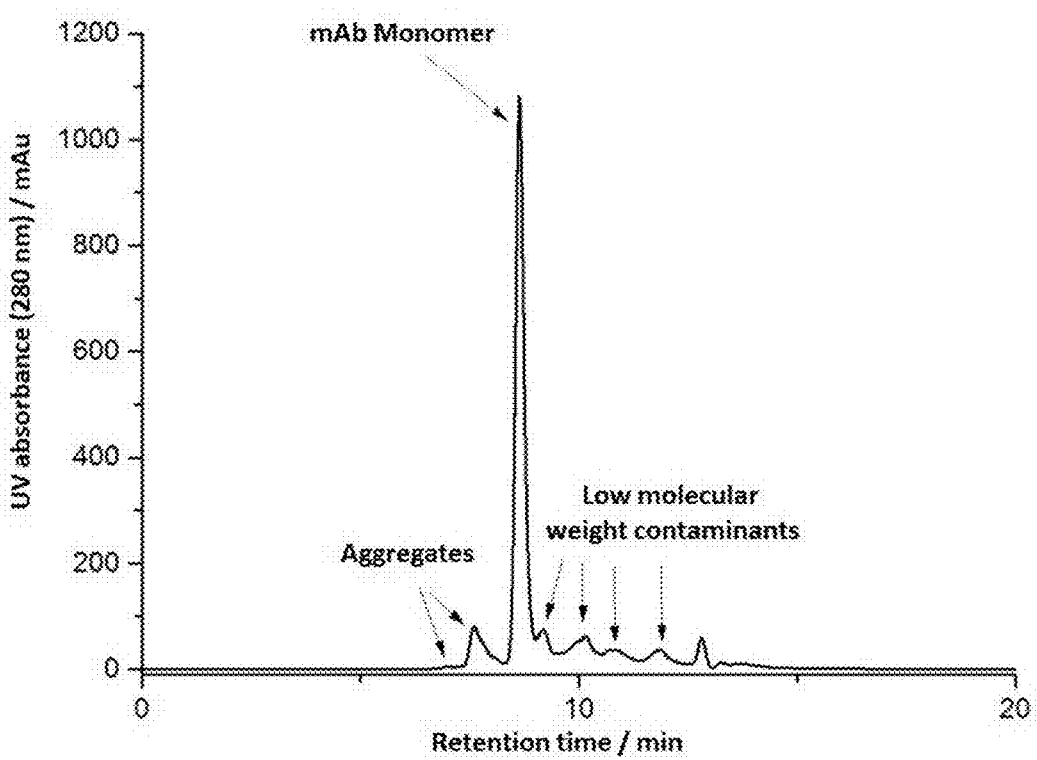
Figure 9:
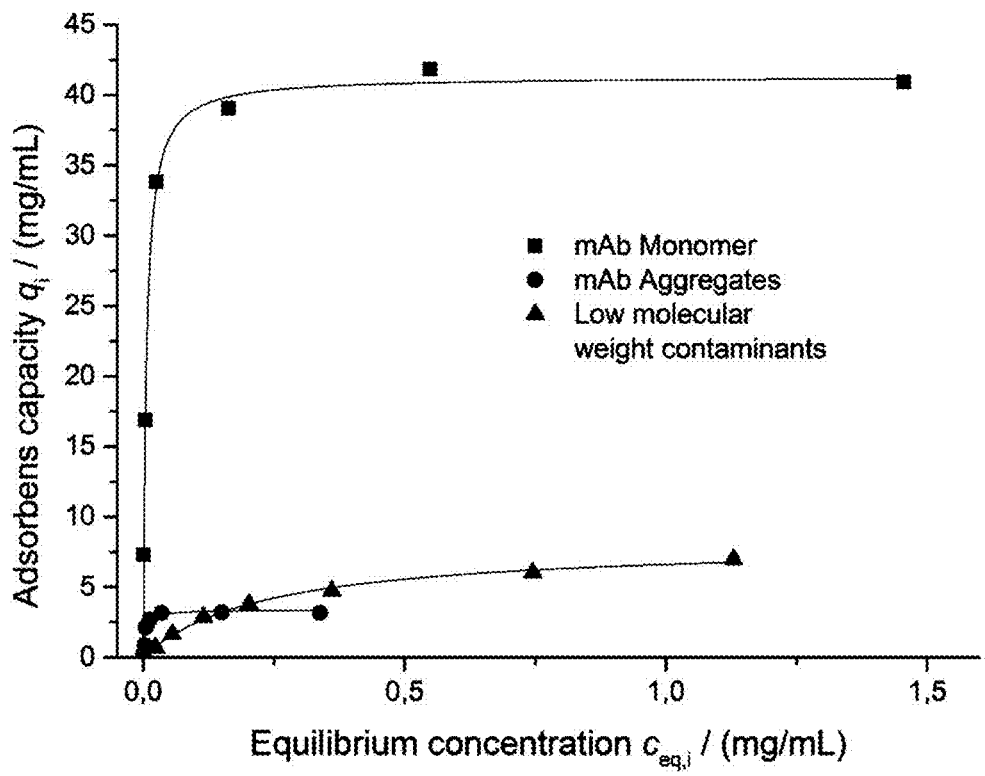
FIG. 9 shows equilibrium adsorption data for multiple components at a salt concentration of 20 mM for a hydrogel grafted chromatographic medium (hydrogel grafted membrane adsorber Sartobind® S) of Example 3a. The graphs represent Langmuir isotherm fits.

The resulting peaks of the obtained size exclusion chromatogram (see FIG. 8 for this Example) can be evaluated using a proper calibration to determine the concentration of the target components during the batch experiments as shown in FIG. 6. This leads to equilibrium adsorption data. An example is shown in FIG. 9 for a given salt concentration.

Figure 10:
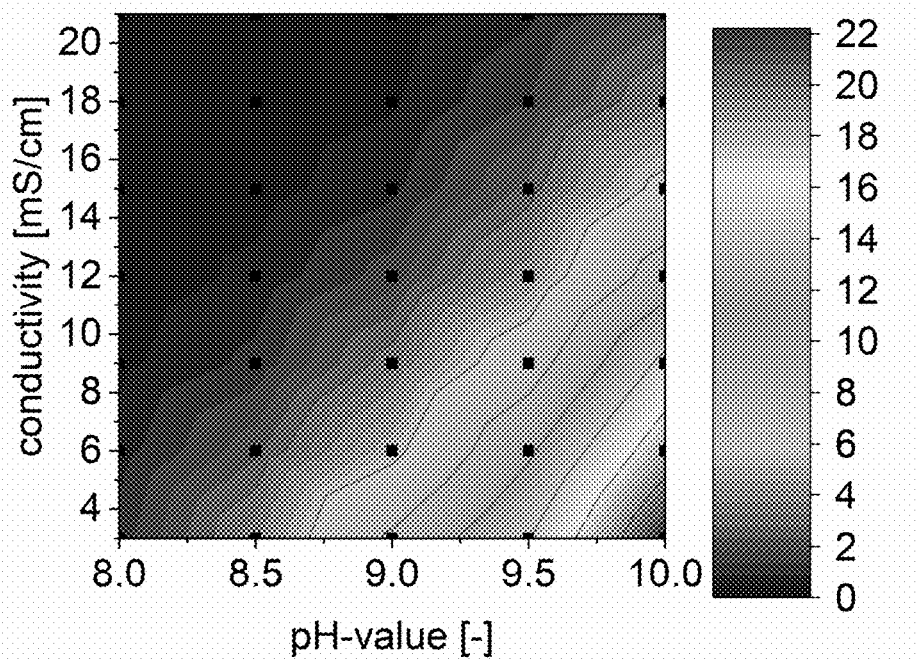
FIG. 10 shows an equilibrium adsorption data map for the monomer of a monoclonal antibody depending on conductivity and pH of Example 3b.
Figure 11:
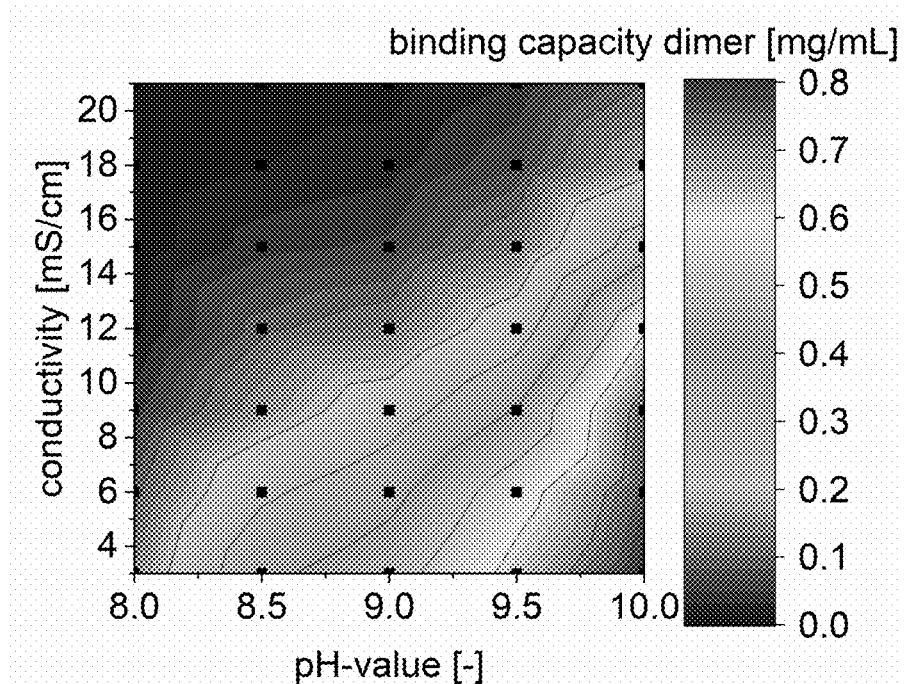
FIG. 11 shows an equilibrium adsorption data map for a dimer of a monoclonal antibody depending on conductivity and pH of Example 3b.

Example 3b: Acquiring Equilibrium Adsorption Data for Varying Salt Concentrations and Varying pH In the above Example 3, only the salt concentration was varied. Following the same approach, other influencing factors like the pH can also be varied, resulting in multidimensional adsorption data maps. FIGS. 10 and 11 show equilibrium adsorption data for the monoclonal antibody IgG and its dimer on Sartobind® Q depending on pH and salt concentration.

Example 4: Fitting of Data Sets to an SMA Isotherm (Step (iv))

The data sets obtained in Example 3 were used to calculate protein characteristic charge $v_i$ and equilibrium constant $K_i$, furthermore the steric factor $\sigma_i$ was fitted using a computer-assisted least square regression at the three different salt concentrations ($c_s$=0.05, 0.15, 0.25 M) to an SMA adsorption isotherm to obtain the necessary adsorption model parameters in the investigated salt concentration area. The ionic capacity $\Lambda$ was 0.97 mol/L (Sartobind® Q).

$$c_i = \frac{q_i}{K_i} \cdot \left( \frac{c_1}{\Lambda - \sum_{i=2}^{n+1} (v_i + \sigma_i) q_i} \right)^{v_i}$$

Adsorption constant: $K_i$=7.55
Steric factor: $\sigma_i$=46.04
Characteristic charge: $v_i$=2.72
Salt concentration: $c_1$=0.05 M

Example 5: Determining the Fluid Dynamic Behavior and Axial Dispersion Coefficient An Äkta™ Explorer from GE Healthcare was selected as the chromatography device (step (v)).

Figure 12:
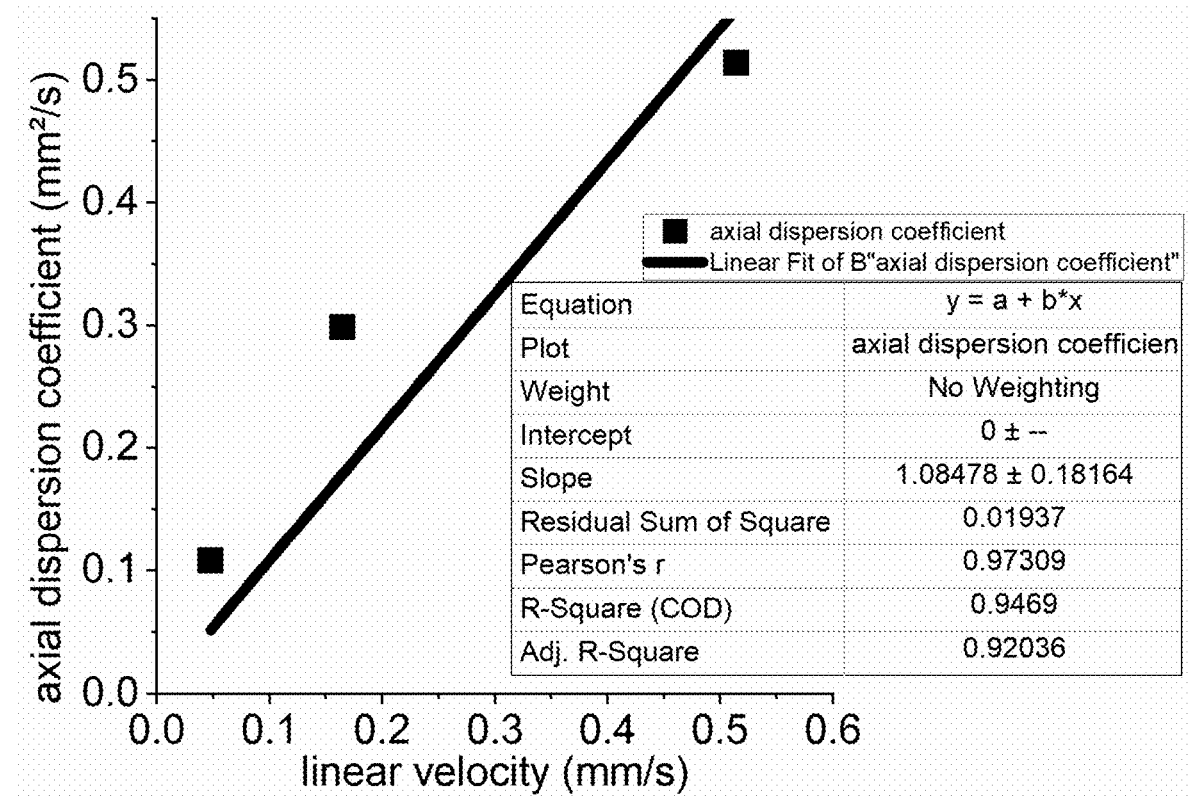
FIG. 12 shows the axial dispersion coefficient for the chromatographic medium depending on the linear flow velocity of Example 5.
Figure 13:
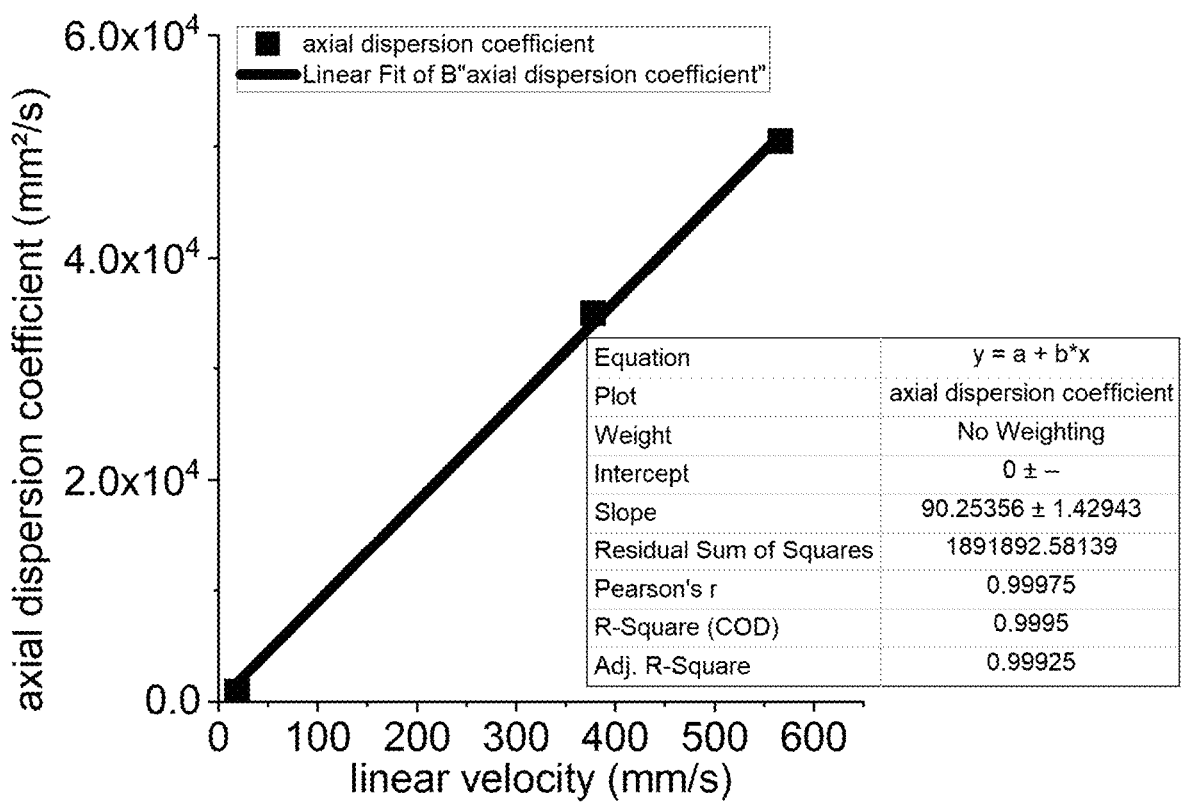
FIG. 13 shows the axial dispersion coefficient $D_{ax}^{DPF}$ of the DPF of the external system "ST+DPF" (see FIG. 17) depending on the linear flow velocity of Example 5.

The parameters $V_{SYS}$, $V_{ST}$, $V_{DPF}$ and $D_{ax}^{DPF}$ were determined as follows. Pulse injections of acetone (2 vol % in reverse-osmosis-water) or mAb (4 mg/mL in potassium phosphate (KPi) buffer, 10 mM, 20 mM NaCl, pH=6) were carried out in the absence of the chromatographic medium. The experiments were performed using different volumetric flow rates and buffer conditions. The resulting peak signals were evaluated following the method of moments and regressed using a least squares fitting procedure to obtain the desired values. The results of this procedure are given in FIGS. 12 and 13.

Example 6: Determination of Kinetic and Diffusion Coefficients

In accordance with the lumped pore model, the effective film-diffusion coefficient $D_{eff}$ was determined using mathematical correlations for a hydrogel modified membrane adsorber Sartobind® S:

The bulk diffusion coefficient was calculated using the Einstein-Stokes equation. In particular, intravenous immunoglobulin (IVIG, human γ-Globulin, SeraCare; r=5.2 nm) was dissolved in an aqueous sodium phosphate buffer (20 mM, pH=7) having a viscosity η of 1.05 mPa s at a temperature of 298 K.

The porosity values were determined using inverse size exclusion chromatography (iSEC). Briefly, the chromatographic bed was equilibrated for 50 column volumes (CVs) of the desired buffer (sodium phosphate buffer (20 mM, pH=7)) before being loaded with injections (100 μL) of a solution containing pullulan molecules (2 mg/mL) with a narrow molecular weight distribution. The mean molecular weight, directly linked to the mean hydrodynamic radius of the applied pullulan samples, was varied for every injection covering a wide range (Mn=320-740,000 g/moL). The elution profile was recorded and analyzed by an RI detector.

The effective diffusion coefficients were calculated using the following correlations.

$$D_{eff} = \frac{D_{bulk}}{\tau}$$

$$\tau = \frac{(2 - \varepsilon_{sp})^2}{\varepsilon_{sp}^2}$$

The values of the internal porosity $\varepsilon_p$ were determined by iSEC as described above.

For a membrane adsorber the following values were calculated depending on the respective target compound NaCl, acetone, and the monoclonal antibody IgG:

|  | Molecular diffusion (coefficient/(m²/s)) | $k_{eff, A}$/ (1/s) |
|---|---|---|
| NaCl | 11.99 · 10⁻⁹ | 56.63 |
| Acetone | 1.14 · 10⁻⁹ | 23.67 |
| Monoclonal antibody | 4.00 · 10⁻¹¹ | 5.47 |

Example 7: Prediction of a Protein Purification Process (Step (vi))

Figure 14:
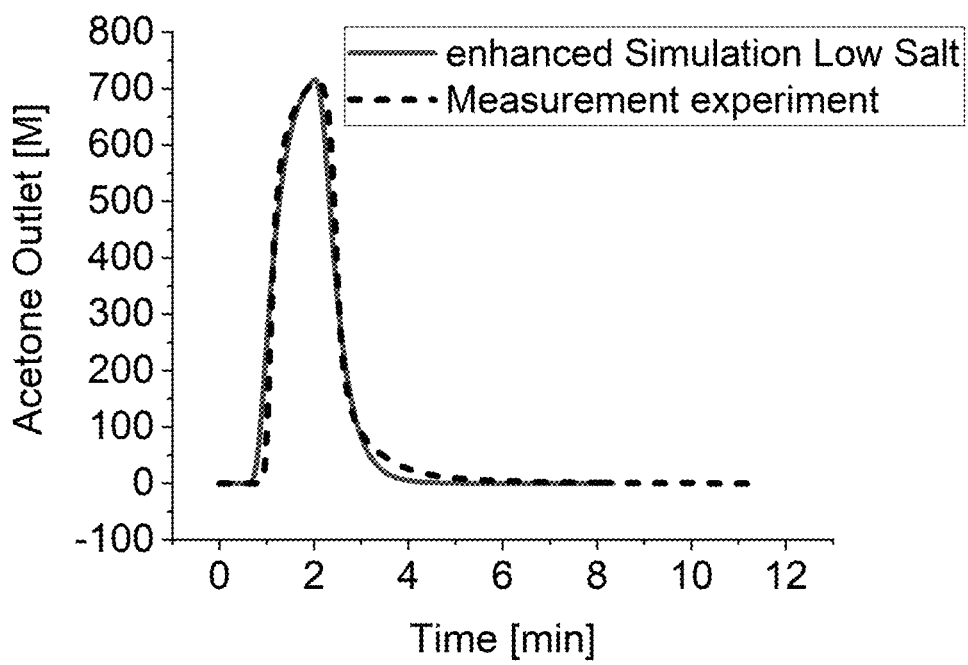
FIG. 14 shows simulation results at low salt concentrations of Example 7.
Figure 15:
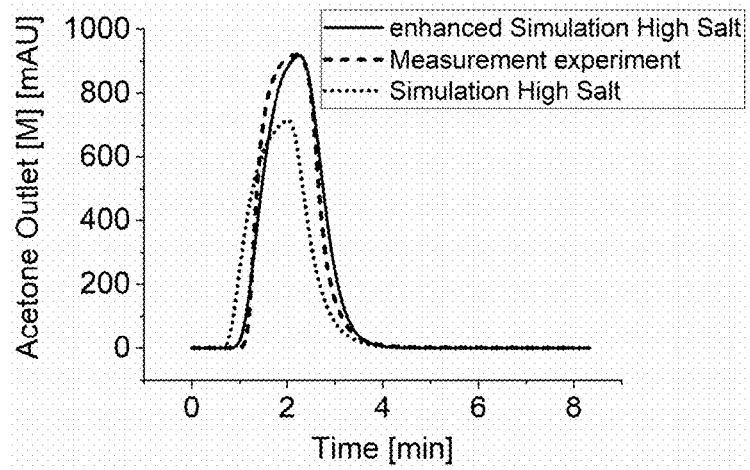
FIG. 15 shows simulation results at high salt concentrations of Example 7.
Figure 17:
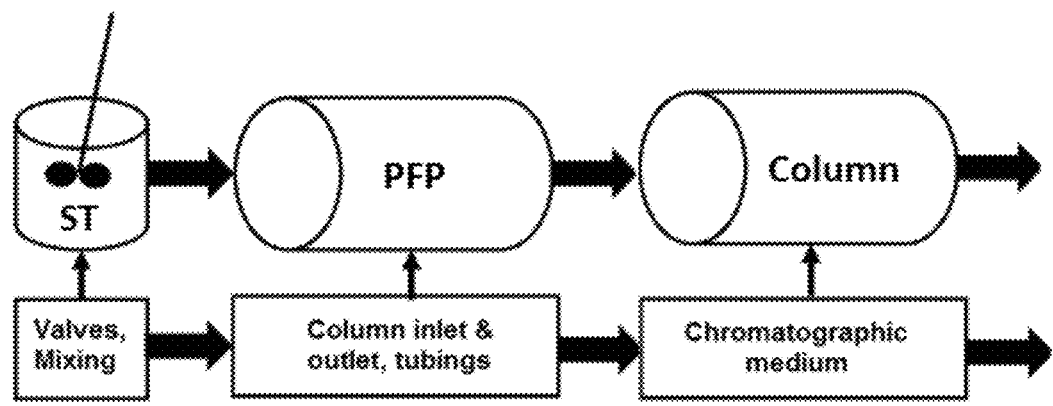
FIG. 17 shows a schematization of a chromatography device in accordance with a preferred embodiment of the present invention.
Figure 18:
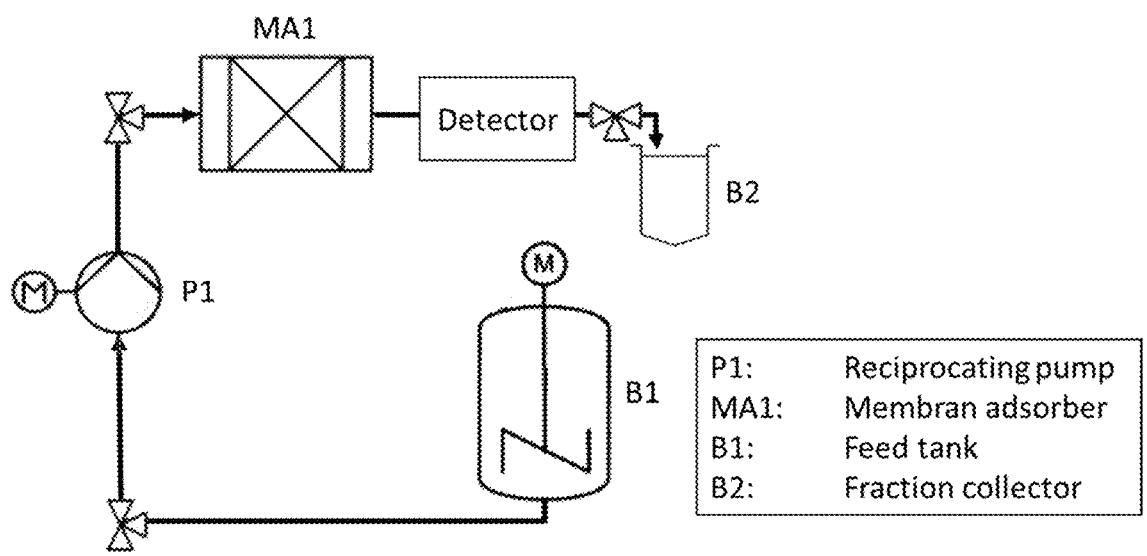
FIG. 18 shows an exemplary chromatographic set-up.

The model parameter sets obtained in Examples 1 and 5 were used to predict the fluid-dynamic behavior of an acetone tracer pulse signal. The adsorption isotherm of acetone on the used membrane adsorber was found to be 0 (acetone does not bind to the stationary phase). The liquid chromatography (LC) system and membrane adsorber (MA) were simulated by the equilibrium dispersive model (EDM). Moreover, the chromatography apparatus was considered as a combination of an ST, DPF and the chromatography column, as described above and as shown in the following equations (see FIG. 17).

$$\frac{\partial c_{out}^{ST}}{\partial t} = \frac{F}{V_{ST}}(c_{in}^{ST} - c_{out}^{ST})$$

$$\frac{\partial c^{DPF}(z^{DPF}, t)}{\partial t} = -v\frac{\partial c^{DPF}(z^{DPF}, t)}{\partial z^{DPF}} + D_{ax}^{DPF}\frac{\partial^2 c^{DPF}(z^{DPF}, t)}{\partial (z^{DPF})^2}$$

$$\frac{\partial c(z, t)}{\partial t} = -\frac{(1-\varepsilon_b)}{\varepsilon_b} \cdot \frac{\partial q(z, t)}{\partial t} - v\frac{\partial c(z, t)}{\partial z} + D_{ax}\frac{\partial^2 c(z, t)}{\partial z^2}$$

wherein $V_{SYS} = V_{ST} + V_{DPF}$ $c(t=0, z) = 0$ $c_{out}^{ST} = c^{DPF}(z^{DPF}=0, t) = c_{in}^{DPF}(t)$ $c^{DPF}(z^{DPF}=z_{max}^{DPF}, t) = c_{out}^{DPF} = c(z=0, t)$ Overall LC System had a pipe length of 2943 mm, a volume of 1.3 mL and a porosity of 1. The overall MA device is represented by 5.73 mm chromatography bed height, 3.5 mL chromatography bed volume and a porosity of 76-71% (0.76-0.71). The used MA was Sartobind® S in 10 mM KPi buffer at pH 7. Tracer experiments were carried out with a 2 mL injection volume of KPi buffer containing 5% acetone with 0 or 0.8 M additional sodium chloride at 4 mL/min. In FIG. 14, the low salt concentration simulation results and experimental data are compared. At low salt concentrations, conventional and improved model approach gave similar results. At high salt concentrations, taking the reversible swelling of the stationary phase into account yielded much better results than a method were the reversible swelling of the stationary phase was not taken into account (see FIG. 15). FIGS. 14 and 15 show the dramatic influence of a varying porosity value with respect to the fluid dynamic behavior.

The following table shows a comparison of a conventional simulation approach with the method according to the present invention corresponding to the half peak width FWHM (Full Width at Half Maximum) and the peak center. The inventive method gave a smaller deviation from the experimental value as the conventional approach.

|  | FWHM | Center |
| --- | --- | --- |
| Deviation conventional simulation to experiment/% | 2.2 | 10.6 |
| Deviation inventive simulation to experiment/% | 2.0 | 2.6 |

Example 8: Fitting of Data Sets to a Langmuir Isotherm (Step (iv))

A data set of equilibrium adsorption data obtained for IVIG on a hydrogel grafted chromatographic membrane was fitted to a Langmuir isotherm taking account of different NaCl concentrations. The results are shown in FIGS. 16 (a) to 16 (c).

Figure 16:
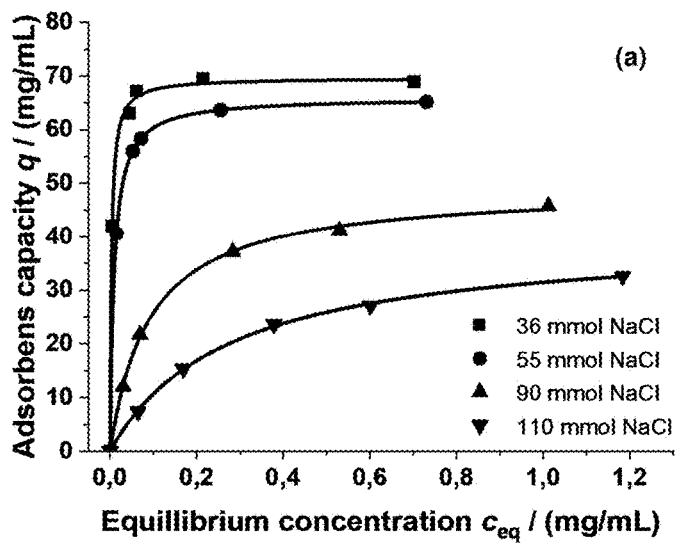
FIG. 16 (a) shows equilibrium adsorption data including a Langmuir isotherm fit of Example 8.
Figure 16:
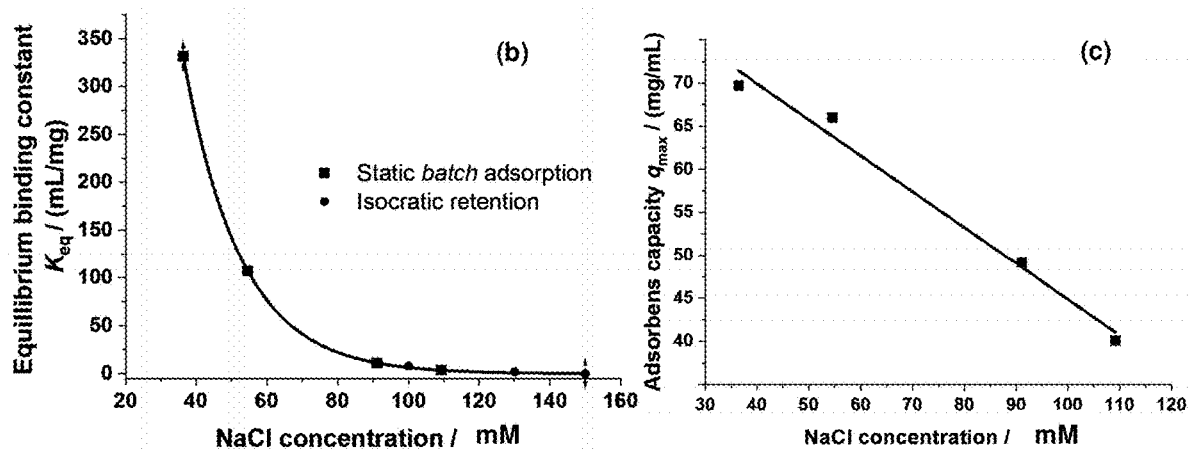

As can be taken from FIG. 16 (a), a Langmuir fit approximates the isotherm adsorption data with high accuracy.

Example 9: Investigation of an Ion-Exchange Chromatography (IEX) Method by Means of Experimental Design (Step (ii))

A conventional batch isotherm determination experimental set up for a one component ionexchange chromatography (IEX) step could be: measuring the bound mass at equilibrium conditions with 6 different feed concentrations $c_{Feed}$, 4 different salt concentrations $c_{Salt}$ and 5 pH values. For instance, the 6 different feed concentrations $c_{Feed}$ could be values ranging from 0.5 to 2.5 in 0.5 g/L steps, the 5 pH values could be values ranging from 5 to 7 in 0.5 steps and the 4 salt concentrations $c_{Salt}$ could be selected as 0.001 M, 0.1 M, 0.2 M, 0.3 M and 0.4 M. This results in a total number of 120 experiments.

Contrary thereto, by using experimental design (design of experiments, DoE), a total number of 27 experiments would be required for a full factorial (fullfac) model or a total number of 17 experiments would be required for a CCF model with star distance 1. The CCF model results are as follows:

| pH | CSalt | CFeed |
| --- | --- | --- |
| 5 | 0.001 | 0.5 |
| 5 | 0.4 | 0.5 |
| 5 | 0.001 | 2.5 |
| 5 | 0.4 | 2.5 |
| 5 | 0.2005 | 1.5 |
| 6 | 0.001 | 1.5 |
| 6 | 0.4 | 1.5 |
| 6 | 0.2005 | 0.5 |
| 6 | 0.2005 | 2.5 |
| 6 | 0.2005 | 1.5 |
| 6 | 0.2005 | 1.5 |
| 6 | 0.2005 | 1.5 |
| 7 | 0.001 | 0.5 |
| 7 | 0.4 | 0.5 |
| 7 | 0.001 | 2.5 |
| 7 | 0.4 | 2.5 |
| 7 | 0.2005 | 1.5 |

Thus, the above Example demonstrates that the number of binding capacity values to be obtained in step (iii) for obtaining the adsorption isotherm in step (iv) can be substantially reduced by carrying out step (ii) based on experimental design.

Example 10: Obtaining, a Global Adsorption Isotherm for Varying pH and Varying Salt Concentration (Step (iv))

Based on the adsorption data acquired in step (iii), a global adsorption isotherm in the applied design space (i.e. the respective range of the concentration, pH and salt concentration) can be obtained. This can be achieved by an evaluation of the underlying statistical experimental plan. Various commercial software is available for the statistical plan design and for the following evaluation, such as MODDE® from Sartorius AG.

Based on experimental binding capacity values obtained in step (iii), a plurality of preliminary adsorption isotherms was obtained (iv-2a), where for each preliminary adsorption isotherm, one of the at least one varying parameter was kept constant. Here, the pH was kept constant while a varying salt concentration is taken account by the preliminary adsorption isotherms. Each of the preliminary fittings was performed to an SMA isotherm. As a result, the following SMA isotherm parameters were obtained.

| pH | equilibrium constant $K_i$ | steric factor $\sigma_i$ | characteristic charge $v_i$ |
| --- | --- | --- | --- |
| 5 | 90.49 | 1549.96 | 0.404 |
| 5.5 | 39.67 | 1401.18 | 0.292 |

| pH | equilibrium constant $K_i$ | steric factor $\sigma_i$ | characteristic charge $v_i$ |
|---|---|---|---|
| 6 | 33.29 | 1506.95 | 0.266 |
| 6.5 | 26.03 | 1581.41 | 0.2 |
| 7 | 21.89 | 1706.3 | 0.1831 |

Based on the results obtained in the preliminary fitting as summarized in the above table, a main fitting step (iv-2b) was carried out. That is, in the main fitting step (iv-2b), a global adsorption isotherm was obtained by fitting one parametric equation to the numerical values of each of the parameters of the SMA isotherms obtained in the preliminary fitting step. The results are displayed in FIG. 20.

The following fitted parametric equations, considering linear, quadratic and cubic terms, were obtained.

$$\log(K_i) = 43.90 - 20.00 \cdot pH + 3.16 \cdot pH^2 - 0.17 \cdot pH^3$$

$$\sigma_i = 34891 - 16251.60 \cdot pH + 2596.88 \cdot pH^2 - 136.08 \cdot pH^3$$

$$v_i = 7.57 - 3.23 \cdot pH + 0.48 \cdot pH^2 - 0.02 \cdot pH^3$$

As can be taken from the results displayed in FIG. 20, the effect of a variation of the pH on the SMA isotherm parameters $K_i$ ("K") and $\sigma_i$ ("steric") is highly non-linear. A conventional linear interpolation would not take this non-linearities into account and thus yield inaccurate results.

The invention claimed is:

1. A method of obtaining an adsorption isotherm of at least one compound comprising the steps of:
    (ia) selecting at least one compound;
    (ib) selecting a stationary phase;
    (ic) selecting a mobile phase;
    (id) selecting a temperature of the at least one compound, the stationary phase and the mobile phase;
        wherein at least one parameter, selected from parameters capable of characterizing the composition of the mobile phase and the temperature, varies;
    (ii) obtaining a plurality of parameter value sets including the at least one varying parameter and the concentration of the at least one compound in the mobile phase;
    (iii) obtaining a plurality of binding capacity values of the at least one compound by the stationary phase for each of the plurality of parameter value sets obtained in step (ii); and
    (iv) obtaining the adsorption isotherm based on the plurality of binding capacity values obtained in step (iii) by means of multivariate data analysis,
wherein the adsorption isotherm obtained in step (iv) is an equation having the form $q=f(c,p_j)$ that relates the binding capacity q of a compound by the stationary phase to the concentration c of the at least one compound in the mobile phase and to at least one further parameter $p_j$ selected from parameters characterizing the composition of the mobile phase and the temperature.

2. The method according to claim 1, wherein the parameters capable of characterizing the composition of the mobile phase are selected from the group consisting of concentrations of solvents included in the mobile phase, pH, salt concentration, and/or concentration of the at least one compound.

3. The method according to claim 1, wherein the number of the at least one varying parameter is two or more.

4. The method according to claim 3, wherein the at least two varying parameters include the pH and the salt concentration of the mobile phase.

5. The method according to claim 1, wherein the plurality of parameter value sets is obtained in step (ii) by means of experimental design.

6. The method according to claim 5, wherein the experimental design is a full factorial design or a fractional factorial design.

7. The method according to claim 1, wherein step (iii) involves one or more laboratory experiments.

8. The method of claim 1 further comprising:
    determining a concentration of at least one compound in a chromatography method by:
    (v) selecting a chromatography device having a chromatography bed comprising the stationary phase and the mobile phase; and
    (vi) calculating a concentration c (z,t) of the at least one compound in the mobile phase at a predetermined location z of the chromatography device and at a predetermined time t based on the adsorption isotherm obtained in step (iv).

9. The method according to claim 8, wherein the method further includes a step of:
    (v') determining at least the flow velocity of the mobile phase in the chromatography bed v and the bulk porosity of the chromatography bed $\varepsilon_b$;
    wherein in step (vi), the calculation of the concentration c(z,t) is further based on the flow velocity v and the bulk porosity $\varepsilon_b$.

10. A method of obtaining at least one stationary phase comprising the steps of:
    (I) executing the method according to claim 1 for m times, wherein m is an integer of 2 or more and the m executions differ from one another with respect to step (ib); and
    (II) selecting the at least one stationary phase based on the result of step (I).

11. A method of evaluating the accuracy of a predetermined adsorption isotherm comprising the method according to claim 1 and a step of comparing the predetermined adsorption isotherm with the adsorption isotherm obtained in step (iv).

12. The method of claim 8, further comprising the step of:
    (vii) performing a chromatography method after performing the steps of claim 8.

13. The chromatography method according to claim 12, wherein step (vii) includes:
    monitoring the values of the at least one varying parameter in the chromatography method.

14. The chromatography method according to claim 13, wherein step (vii) further includes determining for one or more of the monitored values whether a respective predetermined criterion is satisfied and, in case the respective predetermined criterion is not satisfied, modulating one or more of the at least one varying parameters in the chromatography method based on the adsorption isotherm obtained in step (iv).

15. The method of claim 10, further comprising:
    (III) performing the chromatography method after performing the steps of claim 8, using the at least one stationary phase selected in step (II).

* * * * *